(12) United States Patent (10) Patent No.: US 12,190,333 B2
Shiraishi (45) Date of Patent: *Jan. 7, 2025

(54) OBJECT TYPE IDENTIFYING APPARATUS, OBJECT TYPE IDENTIFYING METHOD, AND RECORDING MEDIUM

(71) Applicant: NEC Corporation, Tokyo (JP)

(72) Inventor: Soma Shiraishi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/236,250

(22) Filed: Aug. 21, 2023

(65) Prior Publication Data

US 2023/0394504 A1 Dec. 7, 2023

Related U.S. Application Data

(63) Continuation of application No. 18/085,743, filed on Dec. 21, 2022, which is a continuation of application
(Continued)

(30) Foreign Application Priority Data

Apr. 6, 2016 (JP) .................................. 2016-076511

(51) Int. Cl.
*G06Q 30/018* (2023.01)
*G06Q 10/087* (2023.01)
(Continued)

(52) U.S. Cl.
CPC ....... *G06Q 30/0185* (2013.01); *G06Q 10/087* (2013.01); *G06T 7/20* (2013.01);
(Continued)

(58) Field of Classification Search
CPC .................. G06Q 30/0185; G06T 7/70; G06T 2207/30196; G06V 20/52; G06V 40/10
(Continued)

(56) References Cited

U.S. PATENT DOCUMENTS

| 8,410,927 B2 | 4/2013 | Gabara |
| 9,171,278 B1 | 10/2015 | Kong et al. |

(Continued)

FOREIGN PATENT DOCUMENTS

| JP | 2004-171240 A | 6/2004 |
| JP | 2007-065950 A | 3/2007 |

(Continued)

OTHER PUBLICATIONS

International Search Report for PCT/JP2017/013917 dated Jun. 27, 2017 [PCT/ISA/210].

(Continued)

*Primary Examiner* — Ayodeji O Ayotunde
(74) *Attorney, Agent, or Firm* — Sughrue Mion, PLLC

(57) ABSTRACT

Provided is an object type identifying apparatus that is capable of correctly identifying the types of objects held in a hand of a person. This object type identifying apparatus is provided with: a memory storing instructions; a storage device storing information indicating a type of an object at a position of each object; and one or more processors configured to execute the instructions to: acquire a position of an object; determine whether an object is picked up or an object is placed, based on sensor information; when determined that an object is picked up, identify a type of the picked-up object, based on the position of the object acquired and information stored in the storage device; and when determined that an object is placed, update information stored in the storage device, using an image captured by a camera that captures arrangement of each object from a front side.

6 Claims, 19 Drawing Sheets

Related U.S. Application Data

No. 17/137,756, filed on Dec. 30, 2020, now Pat. No. 11,562,559, which is a continuation of application No. 16/091,235, filed as application No. PCT/JP2017/013917 on Apr. 3, 2017, now Pat. No. 10,922,541.

(51) Int. Cl.
| | | |
|---|---|---|
| *G06T 7/20* | (2017.01) | |
| *G06T 7/70* | (2017.01) | |
| *G06V 20/00* | (2022.01) | |
| *G06V 20/52* | (2022.01) | |
| *G06V 40/10* | (2022.01) | |
| *G08B 25/00* | (2006.01) | |

(52) U.S. Cl.
CPC ............... *G06T 7/70* (2017.01); *G06V 20/00* (2022.01); *G06V 20/52* (2022.01); *G06V 40/10* (2022.01); *G08B 25/00* (2013.01); *G06T 2207/30196* (2013.01)

(58) Field of Classification Search
USPC ........................................................ 382/103
See application file for complete search history.

(56) References Cited

U.S. PATENT DOCUMENTS

| | | | |
|---|---|---|---|
| 10,922,541 B2 * | 2/2021 | Shiraishi | ............... G06V 40/10 |
| 11,562,559 B2 | 1/2023 | Shiraishi | |
| 2014/0132728 A1 | 5/2014 | Verano et al. | |
| 2015/0010204 A1 | 1/2015 | Iwai | |
| 2016/0260161 A1 | 9/2016 | Atchley et al. | |

FOREIGN PATENT DOCUMENTS

| | | |
|---|---|---|
| JP | 2008-201569 A | 9/2008 |
| JP | 2009-009231 A | 1/2009 |
| JP | 5673888 B1 | 2/2015 |
| WO | 2014/136559 A1 | 9/2014 |
| WO | 2015/140851 A1 | 9/2015 |

OTHER PUBLICATIONS

Written Opinion for PCT/JP2017/013917 dated Jun. 27, 2017 [PCT/ISA/237].
US Office Action for U.S. Appl. No. 18/085,743, mailed on Sep. 28, 2023.
JP Office Action for JP Application No. 2023-093619, mailed on May 28, 2024 with English Translation.

\* cited by examiner

Fig. 3
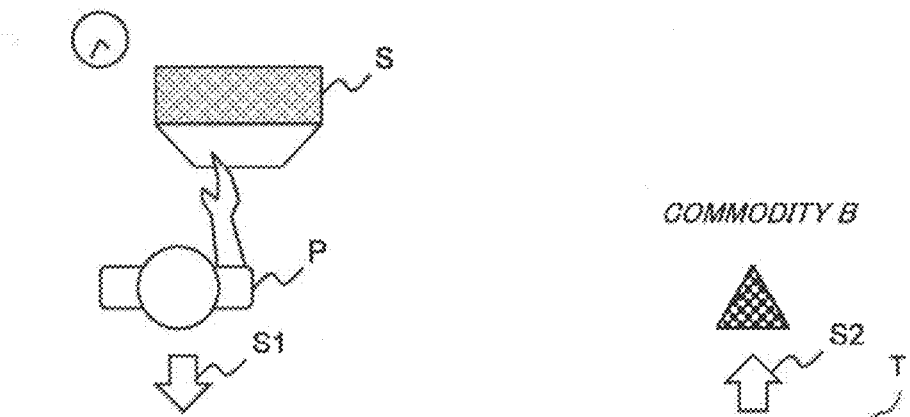
| TIME | COM-MODITY A | COM-MODITY B | COM-MODITY C | COM-MODITY D | COM-MODITY E | COM-MODITY F |
|---|---|---|---|---|---|---|
| 14:00 | (4,4) | (4,8) | (4,12) | (8,5) | (8,10) | (12,10) |
| 15:00 | (4,4) | (4,8) | (4,13) | (8,5) | (8,10) | (12,10) |
| 15:30 | (4,8) | (4,4) | (9,12) | (8,5) | (8,11) | (12,10) |
| 17:00 | (4,8) | (4,4) | (9,12) | (12,4) | (8,10) | (12,10) |
| 21:00 | (4,8) | (5,4) | (9,13) | (12,0) | (8,10) | (12,10) |
| 21:20 | (4,8) | (4,4) | (9,12) | (12,5) | (8,10) | (12,10) |
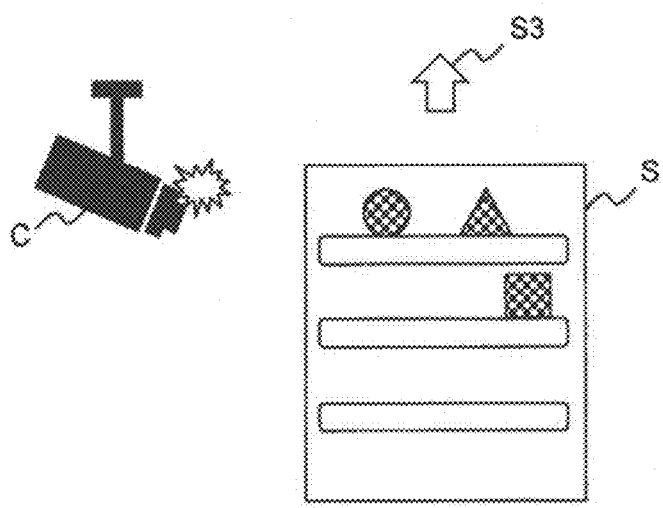

CAMERA IMAGE

Fig. 7

| OBJECT COORDINATES | TYPE OF OBJECT |
|---|---|
| (0,0) | A |
| (0,1) | B |
| (1,0) | C |
| (1,1) | D |
| (2,0) | E |
| (2,1) | F |
| (3,0) | G |
| (3,1) | H |

41

⇑ UPDATE

| TYPE OF OBJECT |
|---|
| A |
| B |
| X |
| Y |
| E |
| F |
| G |
| H |

| COORDINATES(X,Y) | COMMODITY NAME |
|---|---|
| (1,0) | COMMODITY A |
| (1,1) | COMMODITY B |
| | |

Fig. 11

| TIME | COORDINATES(X,Y) | COMMODITY NAME |
|---|---|---|
|  |  |  |
|  |  |  |
|  |  |  |

OBJECT TYPE IDENTIFYING APPARATUS, OBJECT TYPE IDENTIFYING METHOD, AND RECORDING MEDIUM

CROSS REFERENCE TO RELATED APPLICATION

This application is a continuation application of U.S. application Ser. No. 18/085,743 filed on Dec. 21, 2022, which is a continuation application of U.S. application Ser. No. 17/137,756 filed on Dec. 30, 2020, which issued as U.S. Pat. No. 11,562,559, which is a continuation application of U.S. application Ser. No. 16/091,235 filed on Oct. 4, 2018, which issued as U.S. Pat. No. 10,922,541, which is a National Stage of International Application No. PCT/JP2017/013917 filed on Apr. 3, 2017, claiming priority based on Japanese Patent Application No. 2016-076511 filed on Apr. 6, 2016, the disclosures of which are hereby incorporated by reference thereto in their entirety.

TECHNICAL FIELD

The present invention relates to an object type identifying apparatus, an object type identifying method, and a recording medium that identify a type of a target object.

BACKGROUND ART

Various methods of identifying a type of an object placed on a particular position are known. For example, PTL 1 describes a system that captures an image of a customer or a displayed commodity and automatically monitors, on the basis of this captured image, fraudulent picking up of a commodity. The system described in PTL 1 includes a camera arranged facing a shelf on which an object is placed, and performs motion recognition regarding which commodity is picked up by a person, by analyzing an image captured by the camera. Then, the system described in PTL 1 identifies, by using information stored in a memory, the commodity picked up by the person.

Further, PTL 2 describes an apparatus that monitors, by using a captured image, a state of a commodity displayed on a shelf and determines whether or not commodity arrangement is necessary. The apparatus described in PTL 2 also includes a camera arranged facing a shelf on which an object is placed, and determines, on the basis of a captured image, whether or not commodity arrangement is performed by a clerk.

Note that PTL 3 describes that motion recognition of a person is performed by arranging a camera on a shelf.

CITATION LIST

Patent Literature

[PTL 1] Japanese Unexamined Patent Application Publication No. 2004-171240
[PTL 2] Japanese Patent No. 5673888
[PTL 3] U.S. Unexamined Patent Application Publication No. 2014/0132728 description

SUMMARY OF INVENTION

Technical Problem

On the other hand, in the case of the system described in PTL 1, motion recognition is performed on the basis of image analysis, and thus, it is difficult to accurately recognize a motion of a person, which may result in failing to identify a type of a commodity.

Further, in the case of the system described in PTL 1, when a person erroneously moves a commodity to a different place, or when another new commodity is arranged on a shelf, comparison with information stored in a memory cannot be correctly performed. Thus, there is a problem that a type of a commodity picked up by a person cannot be correctly identified. This is similar to the case of using a method described in PTL 3.

Further, the apparatus described in PTL 2 is for determining whether or not commodity arrangement is performed by a clerk, and originally has difficulty in identifying a type of a commodity.

In view of the above, an object of the present invention is to provide an object type identifying apparatus, an object type identifying method, and an object type identifying program that are able to correctly identify a type of an object picked up by a person.

Solution to Problem

An object type identifying apparatus according to the present invention includes:
  position acquisition means for acquiring a position of an object;
  storage means for storing information indicating a type of the object at a position of each object;
  determination means for determining whether an object is picked up or an object is placed, based on sensor information;
  object identifying means for, when the determination means determines that an object is picked up, identifying a type of the picked-up object, based on an output of the position acquisition means and information stored in the storage means; and
  update means for, when the determination means determines that an object is placed, updating information stored in the storage means, using an image captured by a camera that captures an image of arrangement of each object from a front side.

An object type identifying method according to the present invention includes:
  determining whether an object is picked up or an object is placed, based on sensor information;
  acquiring, when determined that an object is picked up, a position of an object, and identifying a type of the picked-up object, based on information stored in storage means which stores information indicating a type of an object at a position of each object and the positon of the object acquired; and
  updating, when determined that an object is placed, information stored in the storage means, using an image captured by a camera that captures an image of arrangement of each object from a front side.

An storage medium according to the present invention stores an object type identifying program that causes a computer to execute:
  a position acquisition process of acquiring a position of an object;
  a determination process of determining whether an object is picked up or an object is placed, based on sensor information;
  an object identification process of, when determined at the determination process that an object is picked up, identifying a type of the picked-up object, based on an acquisition result of the position acquisition process and information stored in storage means which stores information indicating a type of an object at a position of each object; and an updating process of, when determined at the determination process that an object is placed, updating information stored in the storage means, using an image captured by a camera that captures an image of arrangement of each object from a front side.

Advantageous Effects of Invention

The present invention is able to correctly identify a type of an object picked up by a person.

BRIEF DESCRIPTION OF DRAWINGS

FIG. 3 is an explanatory diagram illustrating an outline of an object type identifying apparatus according to an example embodiment.

FIG. 7 is an explanatory diagram illustrating an example of processing of updating a correspondence relation.

FIG. 10 is an explanatory diagram illustrating an example of information stored in a correspondence relation storage unit.

FIG. 11 is an explanatory diagram illustrating an example of a list of picked-up commodities.

EXAMPLE EMBODIMENT

Figure 1:
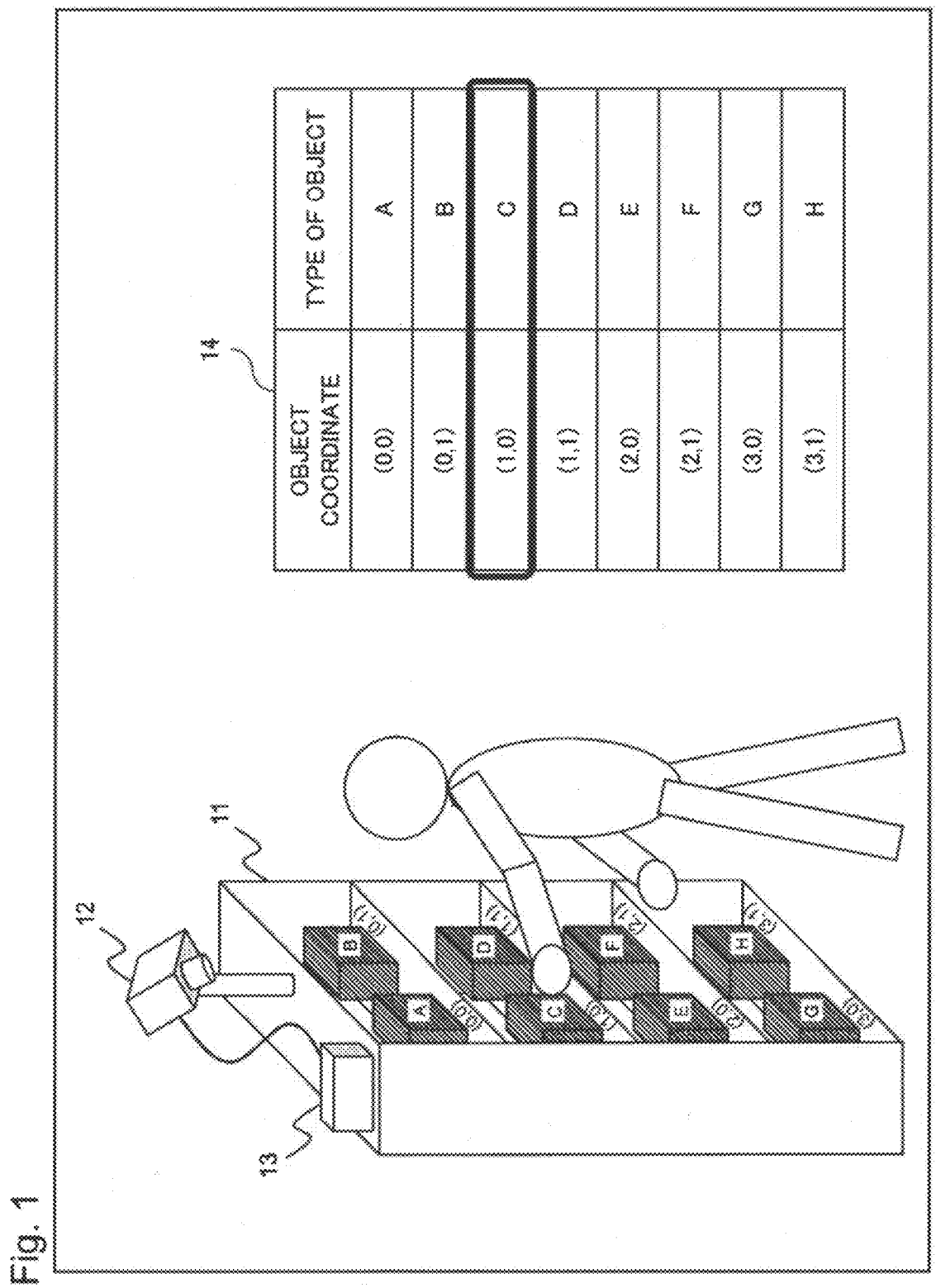
FIG. 1 is an explanatory diagram illustrating an example of a situation in which an object type identifying method according to an example embodiment is used.

First of all, an object type identifying method according to an example embodiment is summarized with reference to FIG. 1. FIG. 1 is an explanatory diagram illustrating an example of a situation in which an object type identifying method is used. In the example illustrated in FIG. 1, a plurality of objects are arranged on a shelf 11, and an operation of a person being present in front of the shelf 11 is recognized by using a camera 12 and an information processing terminal 13. Note that, a commodity is one example of an object, but an object is not limited to a commodity for sale. An object means a thing, an item, a good, or an article that has a shape and can be seen or touched by a person. Further, the information processing terminal 13 holds a correspondence table 14 in which a type of an object (an object type) is associated with coordinates (hereinafter, referred to as object coordinates) indicating a position of the object. Hereinafter, a method of identifying a position of each object on the basis of object coordinates is described, but a method of identifying a position of an object is not limited to identifying on the basis of object coordinates.

Object coordinates may be represented by, for example, a position (x, y, z) in a three-dimensional space with an origin located at a given point on a real space, or may be represented by a position (x, y) in a two-dimensional space on a front face of the shelf 11 with an origin located at a given point on the front face. In the example illustrated in FIG. 1, a position of each object is represented by two-dimensional coordinates with an origin located at a top left corner of the front face of the shelf 11. In the example illustrated in FIG. 1, it is represented that a type of an object identified by object coordinates (1, 0) is "C".

Here, when a given object is moved from a position indicated by object coordinates of the object, there occurs a discrepancy between a correspondence relation between an object and object coordinates set in the correspondence table 14, and an actual correspondence relation. Occurrence of such a discrepancy results in lower recognition precision of an object. In view of the above, the object type identifying method according to the present example embodiment updates an object position appropriately in conformity with an actual position of an object.

Figure 2:
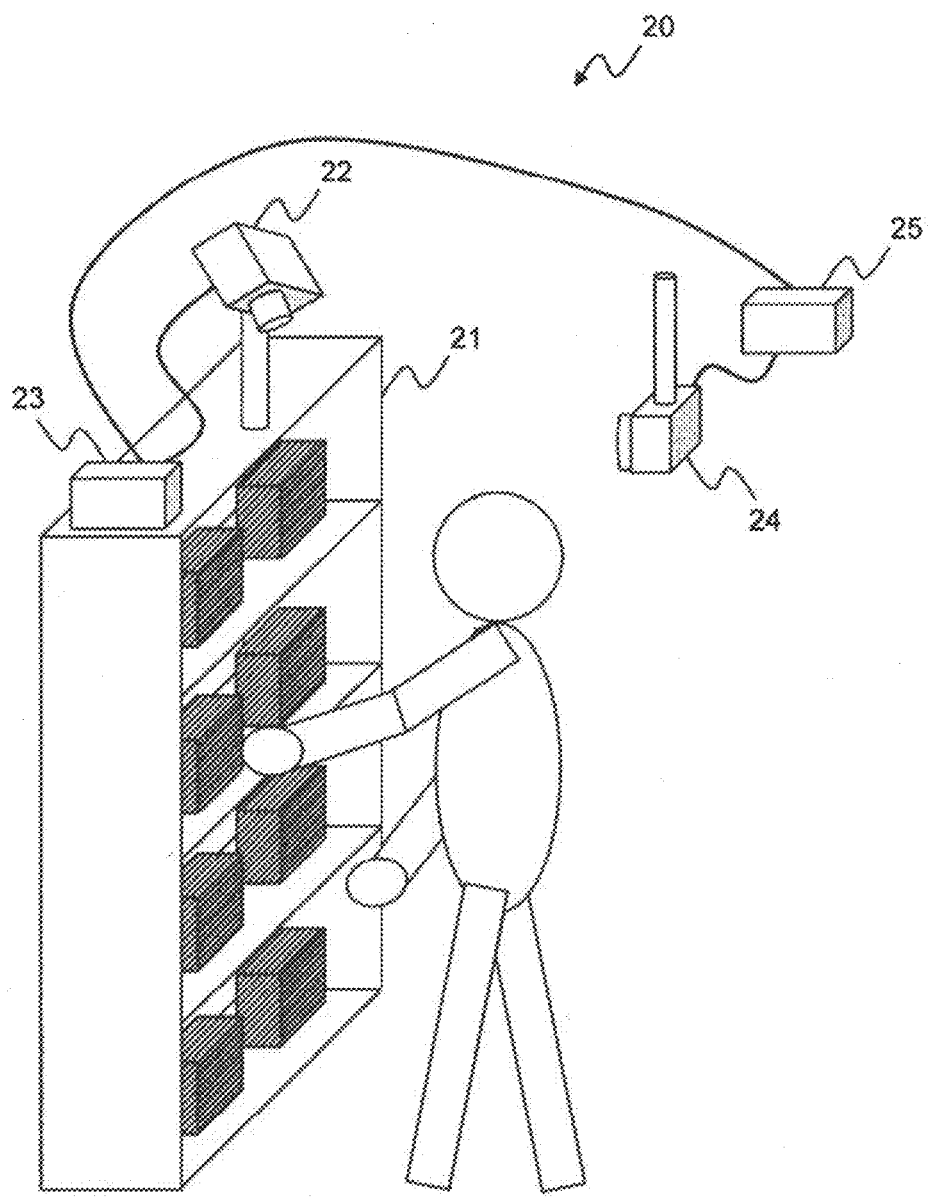
FIG. 2 is an explanatory diagram illustrating one example of a configuration for implementing an object type identifying method according to an example embodiment.

FIG. 2 is an explanatory diagram illustrating one example of a configuration for implementing an object type identifying method. An object type identifying system 20 exemplified in FIG. 2 is one example of a system that includes an object type identifying apparatus according to the invention of the present application. The object type identifying system 20 recognizes, by using an information processing terminal 23 connected with a camera 22, an operation of a person being present in front of a shelf 21, and, upon acquiring object coordinates on the shelf 21, recognizes a target object by using a correspondence table (for example, the correspondence table 14). Further, the object type identifying system 20 captures, by using a camera 24 and an information processing terminal 25, an image of a front face (front side) of the shelf 21, acquires a type of an object and object coordinates by means of image recognition, and updates the correspondence table 14. Note that, a type of an object that is acquired by means of image recognition is, for example, a name of an object, a commodity name, a size, a price, or the like.

FIG. 3 is an explanatory diagram illustrating an outline of an object type identifying apparatus. A table T exemplified in FIG. 3 corresponds to the correspondence table 14 exemplified in FIG. 1. In an example illustrated in FIG. 3, a position of a commodity is represented by using two-dimensional coordinates, and a result of accumulatively recording a position of a commodity for each time is indicated. A content in the table T is updated at a determined update timing or regularly. A time in the table T indicates, for example, an update timing. In the example illustrated in FIG. 3, a correspondence relation is accumulatively recorded, but one master may be provided and a content thereof may be overwritten and updated.

Further, on an upper side of FIG. 3, an operation of identifying an object is exemplified. When an image sensor such as an RGB camera or a depth camera detects an operation by a person P putting his/her hand into a shelf S, the object type identifying apparatus detects a position into which the person put the hand, on the basis of information of the sensor (Step S1). For example, when it is assumed that a detected position is a position identified by an object coordinate value (4, 4) and that a time is 16:45, the object type identifying apparatus refers to the table T, and identifies the object as a commodity B (Step S2).

Further, on a lower side of FIG. 3, an operation of recognizing a type of an object is exemplified. A camera C that captures an image of arrangement of each object from a front side is installed, and the camera C captures an image of each object disposed on the shelf S. The camera C corresponds to the camera 24 in FIG. 2. In the invention of the present application, the table T is updated at a timing when an object is placed on a shelf, or at a timing determined in advance (Step S3). In this way, the table T is appropriately updated as needed, and thus, precision of image recognition is improved. As a result, a type of an object picked up by a person can be correctly identified.

Hereinafter, each example embodiment is described with reference to the drawings.

Example Embodiment 1

Figure 4:
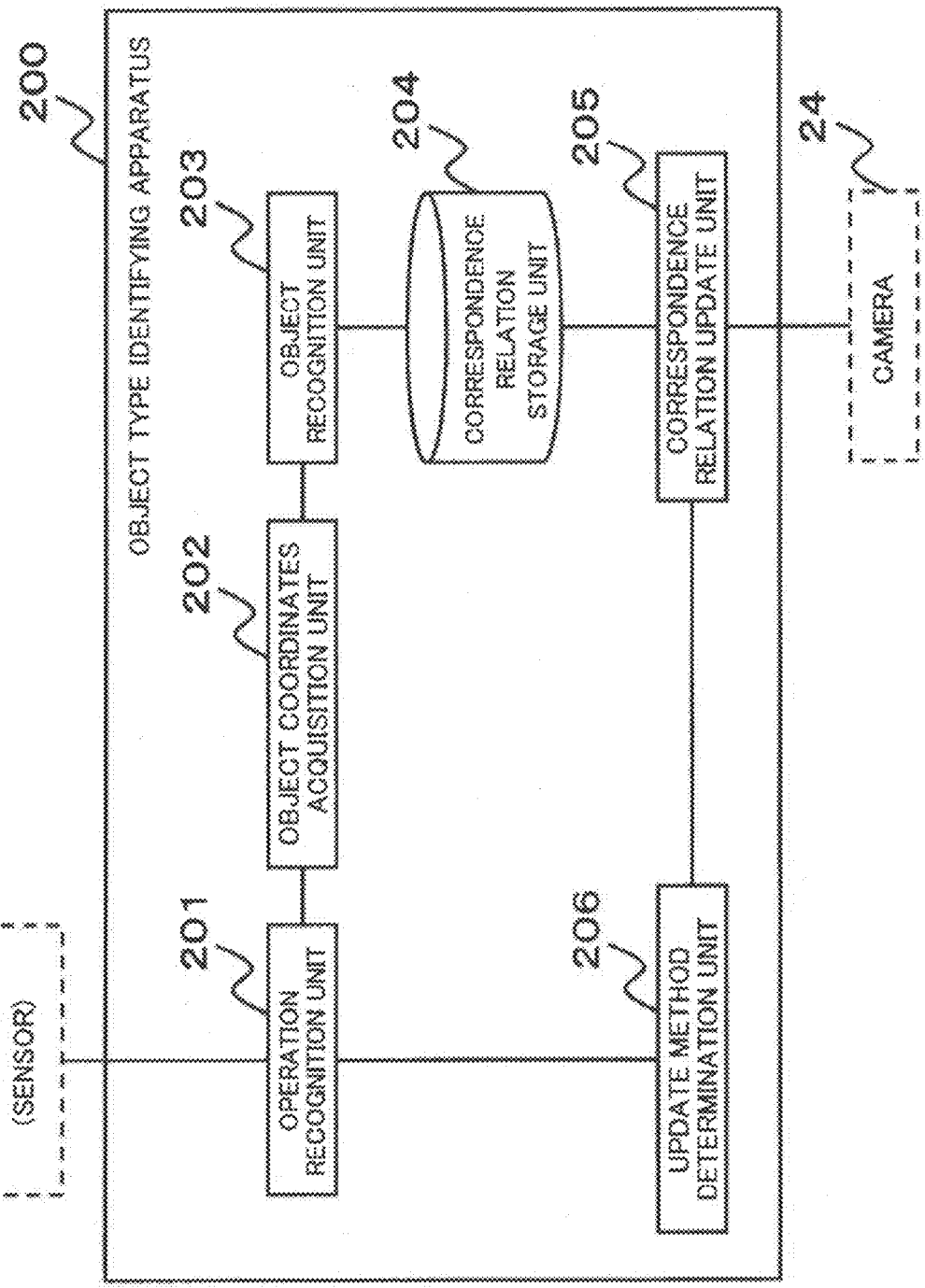
FIG. 4 is a block diagram illustrating a configuration example of an object type identifying apparatus according to a first example embodiment.

FIG. 4 is a block diagram illustrating a configuration example of an object type identifying apparatus according to a first example embodiment.

An object type identifying apparatus 200 according to the present example embodiment includes an operation recognition unit 201, an object coordinates acquisition unit 202, an object recognition unit 203, a correspondence relation storage unit 204, a correspondence relation update unit 205, and an update method determination unit 206.

The operation recognition unit 201 recognizes an operation of a subject. A subject in the present example embodiment involves some change on a state of an object, and examples of a subject include, for example, a person, a robot, and the like. A method by which the operation recognition unit 201 recognizes an operation of the subject is arbitrary. In the present example embodiment, the operation recognition unit 201 determines whether an object is picked up or an object is placed, on the basis of information of the camera 22 (sensor). For this reason, the operation recognition unit 201 can be said as a determination unit.

The operation recognition unit 201 may use, as the camera 22, an image sensor such as, for example, an RGB camera or a depth camera, and may recognize an operation of "picking up an object", "placing an object", "no operation", or the like performed by a subject, from a change in color or volume of a periphery of a particular part such as a hand. A depth camera is a camera that is able to measure depth information from the camera to an image-capturing target, as well as RGB information that is acquired by normal image capturing.

Further, for example, when a pressure sensor is installed in advance at a place where an object is placed (for example, a face on which an object is arranged), the operation recognition unit 201 may determine whether an object is picked up or an object is placed, on the basis of pressure sensor information instead of the camera 22.

Note that, a sensor used for determination of an operation is not limited to a pressure sensor, and may be, for example, a sensor or the like using infrared radiation. Further, other than the above, the operation recognition unit 201 may recognize an operation of a person, a robot, or the like, by using an arbitrary method that is capable of determining an operation.

The object coordinates acquisition unit 202 acquires a position of an object that is a target of an operation. In the present example embodiment, it is assumed that the object coordinates acquisition unit 202 acquires object coordinates as a position of an object. For this reason, the object coordinates acquisition unit 202 can be said as an object position acquisition unit. As described above, object coordinates indicate coordinates where an object that is a target of an operation performed by a person, a robot, or the like is arranged.

The object coordinates acquisition unit 202 acquires object coordinates by using, for example, an image captured by the camera 22. Specifically, the object coordinates acquisition unit 202 identifies two-dimensional coordinates on an image of a part of a person, such as a face or a hand, from image information that can be acquired by an RGB camera such as, for example, a monitor camera. The object coordinates acquisition unit 202 may acquire object coordinates from the image, by associating in advance the identified two-dimensional coordinates with object coordinates in a real space.

Further, when using a depth camera rather than an RGB camera, it is possible to acquire real-space three-dimensional coordinates of a part of a person, and thus, the object coordinates acquisition unit 202 may use the real-space three-dimensional coordinates as object coordinates.

Further, other than a method of using an image, the object coordinates acquisition unit 202 may acquire object coordinates by using a pressure sensor described above. For example, when a sensor such as a pressure sensor is installed in advance on a face on which an object is arranged, the object coordinates acquisition unit 202 may acquire, as object coordinates, coordinates where pressure is largely changed when an operation of "taking" (picking up) an object is performed.

However, a method by which the object coordinates acquisition unit 202 acquires object coordinates is not limited to the above-described method.

The correspondence relation storage unit 204 stores information indicating a type of an object at a position of each object. Specifically, the correspondence relation storage unit 204 stores a correspondence relation between a type of a recognition target object and object coordinates that are coordinates where the object is located. Further, other than a correspondence relation between an object and object coordinates, the correspondence relation storage unit 204 may store an update time at which the correspondence relation is updated, in association with the correspondence relation. In the present example embodiment, it is assumed that the correspondence relation storage unit 204 holds the correspondence table 14 (in other words, a correspondence relation between object coordinates and a type of an object) exemplified in FIG. 1.

Figure 5:
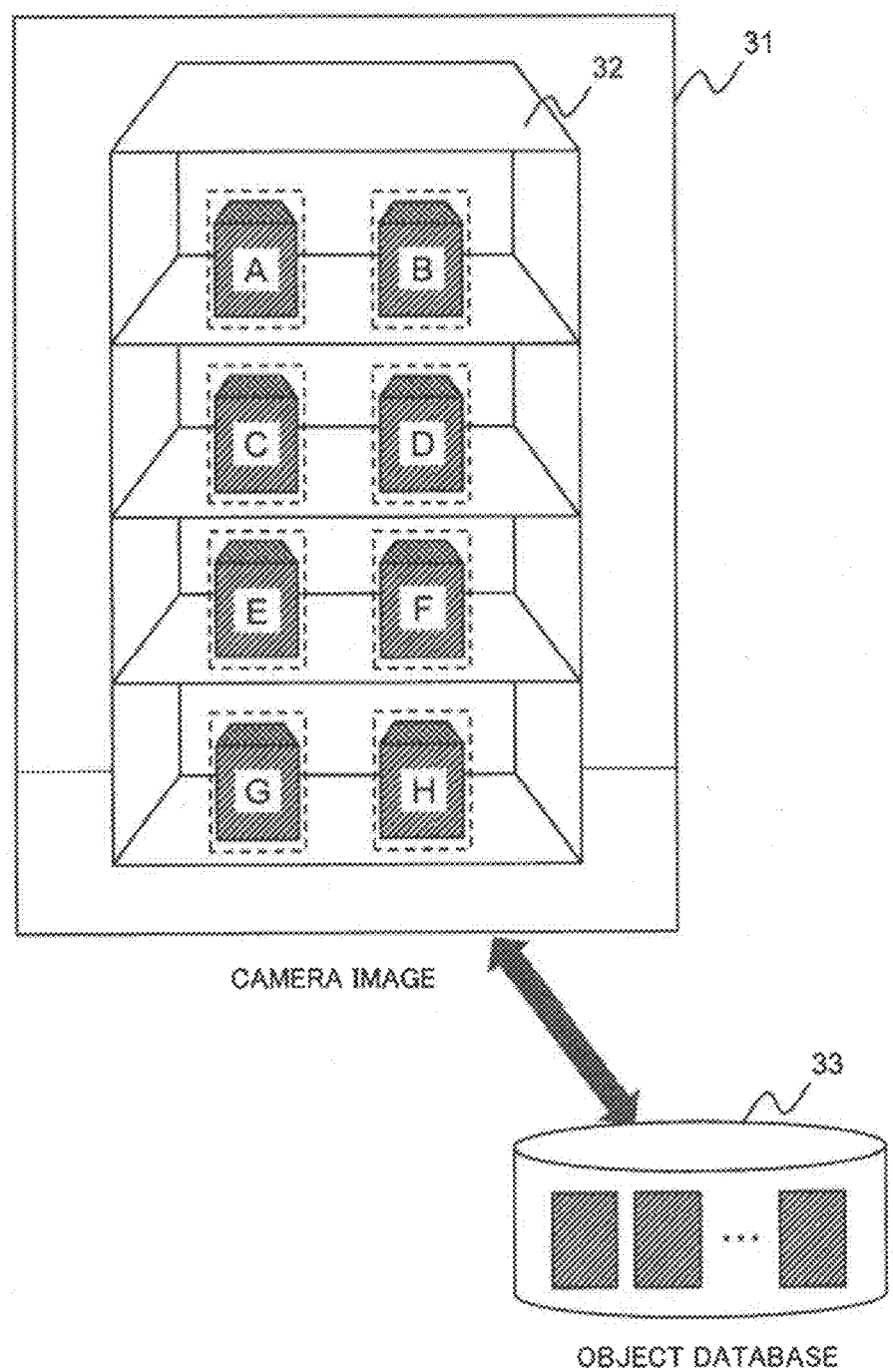
FIG. 5 is an explanatory diagram illustrating an example of setting a correspondence relation on the basis of a captured image.

A correspondence relation between object coordinates and a type of an object is set in advance. FIG. 5 is an explanatory diagram illustrating an example of setting a correspondence relation on the basis of a captured image. For example, it is assumed that the object type identifying apparatus 200 is connected with the camera 24 and the information processing terminal 25 exemplified in FIG. 2. In this case, when the camera 24 acquires a camera image 31 as exemplified in FIG. 5, the information processing terminal 25 may determine which two-dimensional coordinates on the camera image 31 correspond to two-dimensional coordinates on a shelf 32, and may determine object coordinates for each object and set the object coordinates in a correspondence table. Further, the correspondence relation storage unit 204 may store, in an object database 33, not only a correspondence relation between an object and object coordinates, but also an image feature amount of each object extracted from the camera image 31 or another image. The object database 33 is stored in, for example, the correspondence relation storage unit 204.

The object recognition unit 203 recognizes a type of an object that is a target of an operation. Specifically, when the operation recognition unit 201 determines that an object is picked up, the object recognition unit 203 identifies a type of the picked up object, on the basis of a position of an object acquired by the object coordinates acquisition unit 202 and information stored in the correspondence relation storage unit 204. For this reason, the object recognition unit 203 can be said as an object identifying unit.

The object recognition unit 203 may refer to object coordinates acquired by the object coordinates acquisition unit 202 and the correspondence table 14 held in the correspondence relation storage unit 204, and may define, as a recognition result, a type of an object associated with the object coordinates. Further, in addition to a recognized type of an object, the object recognition unit 203 may define, as a recognition result, an operation of a subject recognized by the operation recognition unit 201.

For example, it is assumed that the correspondence relation storage unit 204 stores the correspondence table 14 exemplified in FIG. 1. Then, it is assumed that the operation recognition unit 201 recognizes an operation of "picking up" performed by a subject, and that the object coordinates acquisition unit 202 acquires object coordinates (1, 0). In this case, the object recognition unit 203 recognizes an object that is a target of an operation as "C", from a position indicated by the acquired object coordinates. At this time, the object recognition unit 203 may define object "C" as a recognition result, may define a content including an operation, "picking up" object "C", as a recognition result, and further, may define a content including object coordinates, "picking up" object "C" from object coordinates (1, 0)', as the recognition result.

However, a method by which the object recognition unit 203 recognizes an object that is a target of an operation is not limited to the above-described method. In an example described above, the object recognition unit 203 acquires, from the correspondence table 14, a type of an object to which object coordinates correspond. However, even when object coordinates are within a certain range, the object recognition unit 203 may acquire a corresponding type of an object.

For example, when it is assumed that p(o) is object coordinates associated with an object o on the correspondence table 14, Distance(p1,p2) is a distance between p1 and p2, threshold$_{dist}$ is a threshold value, and a type of an object on the correspondence table 14 is a set O, identity of an object is represented by Expression 1 exemplified below.

[Mathematical 1]

$$\hat{o} = \mathrm{argmin}_{o \in O} \mathrm{Distance}(\hat{p}, p(o)) \text{ if } \mathrm{Distance}(\hat{p}, p(\hat{o})) \leq \mathrm{threshold}_{dist}$$ (Expression 1)

wherein $\hat{p}$ is object coordinates acquired by the object coordinates acquisition unit 202, and ö is an object.

The correspondence relation update unit 205 updates a correspondence relation between information indicating a type of an object stored in the correspondence relation storage unit 204 and a position of the object. Specifically, when the operation recognition unit 201 determines that an object is placed, the correspondence relation update unit 205 updates a type and a position of the object. In the present example embodiment, the correspondence relation update unit 205 updates information stored in the correspondence relation storage unit 204, by using an image of arrangement of each object captured by the camera 24 from a front side.

The correspondence relation update unit 205 recognizes object coordinates and a type of an object from an image (for example, the camera image 31 exemplified in FIG. 5) captured by the camera 24, and identifies a type of an object and object coordinates on the image by performing matching between the image and an image feature amount stored in a database (for example, the object database 33 exemplified in FIG. 5). Then, the correspondence relation update unit 205 refers to a correspondence relation stored in the correspondence relation storage unit 204, and updates a correspondence relation between the identified object coordinates and the type of the object.

Figure 6:
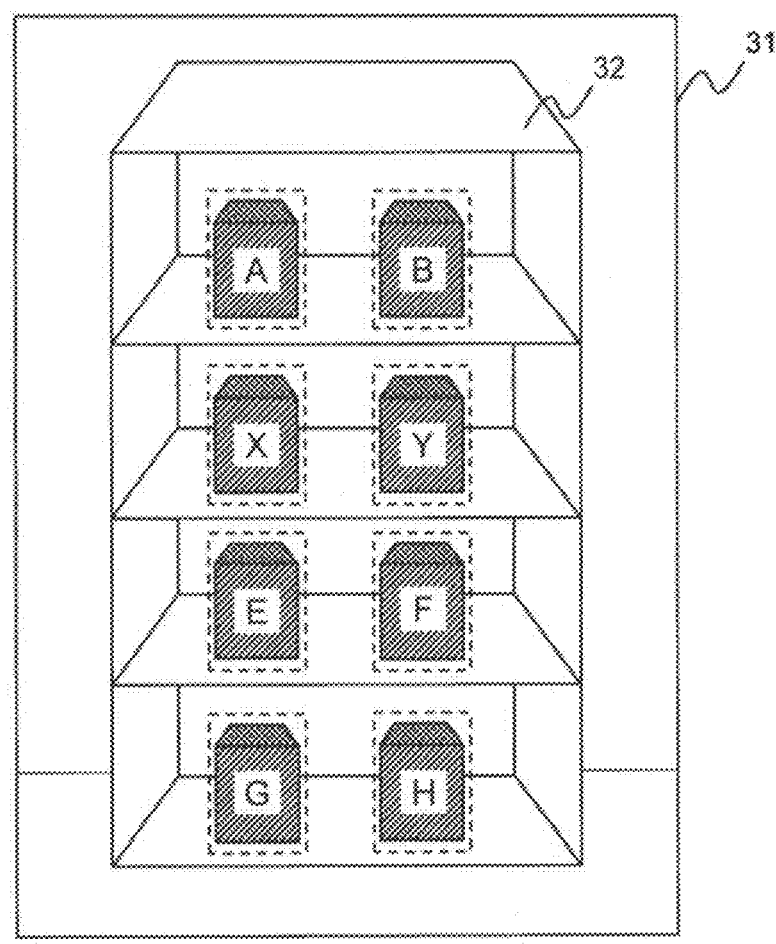
FIG. 6 is an explanatory diagram illustrating an example of a camera image after an object is changed.

FIG. 6 is an explanatory diagram illustrating an example of a camera image after an object is changed. Further, FIG. 7 is an explanatory diagram illustrating an example of processing of updating a correspondence relation. For example, when the camera 24 captures a camera image exemplified in FIG. 6, the correspondence relation update unit 205 identifies, from the captured camera image, a type of an object and object coordinates on the image. In the case of this example, the correspondence relation update unit 205 identifies that, from an initial state exemplified in FIG. 5, an object at a position indicated by object coordinates (1, 0) is changed from "C" to "X", and an object at a position indicated by object coordinates (1, 1) is changed from "D" to "Y". In view of the above, the correspondence relation update unit 205 updates the object corresponding to object coordinates (1, 0) to "X", and updates the object corresponding to object coordinates (1, 1) to "Y".

The update method determination unit 206 determines a method of updating a correspondence relation stored in the correspondence relation storage unit 204. In other words, the correspondence relation update unit 205 updates information of the correspondence relation storage unit 204 on the basis of determination of the update method determination unit 206. Note that, when an update method is determined in advance, the object type identifying apparatus 200 may not include the update method determination unit 206.

Note that, in the present example embodiment, when the operation recognition unit 201 determines that an object is placed, the correspondence relation update unit 205 updates a type and a position of the object. Thus, the update method determination unit 206 detects, by using the operation recognition unit 201, placing of an object, and determines a detected timing as an update timing T100. However, an update timing determined by the update method determination unit 206 is not limited to a timing when an object is placed. Hereinafter, another method of determining an update timing is described.

The update method determination unit 206 may determine, for example, an update timing T101 as a time interval determined in advance. For example, when a time interval is determined in advance as thirty minutes, the update method determination unit 206 may determine the update timing T101 as 9:00, 9:30, 10:00 . . . .

Further, the update method determination unit 206 may determine an update timing T102 by using a camera image. Specifically, when there is a large difference between an image used in previous update of the correspondence relation storage unit 204 and a newly captured image (in other words, the difference between the both images exceeds a predetermined threshold value), the update method determination unit 206 may determine, as the update timing T102, a time at which the image is captured.

The update method determination unit 206 acquires, for example, camera images of a plurality of times captured by a stationary camera, and calculates a background difference of a target region in the image. At this time, the update method determination unit 206 may determine a time at which a certain amount or more of change is detected, as the update timing T102. Here, a target region may be, for example, a front face of a shelf on which an object is disposed, or may be an environment around a shelf.

Further, the update method determination unit 206 may determine an update timing T103 by using information acquired from a sensor installed on a face on which an object is arranged. For example, when a pressure sensor is installed on a face on which an object is arranged, the update method determination unit 206 may receive an output value in chronological order from the pressure sensor, and may define, as the update timing T103, a time at which a change in the output value exceeds a threshold value designated in advance.

Further, the update method determination unit 206 may redetermine a new update timing on the basis of a plurality of considered update timings. The update method determination unit 206 may generate, for example, a queue for update when any of the above-described update timings T100, T101, T102, and T103 is determined, and may redetermine an update timing T104 by using another method when the queue is present.

For example, as a flag indicating whether or not a queue for update is generated, IsToUpdated is prepared.
When a queue for update is generated, the update method determination unit 206 sets the flag to IsToUpdated=true. Only when the flag is IsToUpdated=true, the update method determination unit 206 detects another object or a person other than an object that is a recognition target, in a target region of an image captured by a camera.

When another object or a person is not detected, the update method determination unit 206 may define a not-detected timing as the update timing T104. Note that the update method determination unit 206 may set the flag to IsToUpdated=false at a timing when the update timing T104 is determined.

For example, when determination is made only by an update method using a camera, existence of an obstacle (for example, a person or the like) to an update timing target may prevent appropriate update. However, in the present example embodiment, the update method determination unit 206 determines an update method on the basis of a plurality of pieces of information, and thus, inappropriate update can be prevented.

Figure 19:
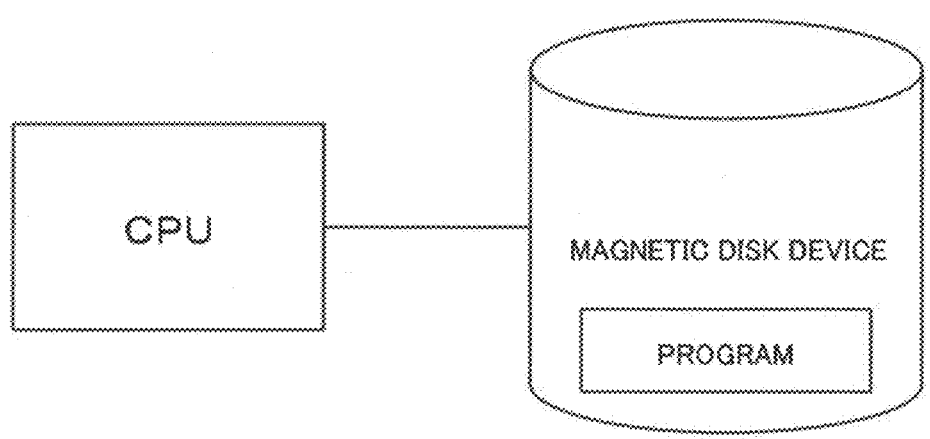
FIG. 19 is a block diagram illustrating one example of a hardware configuration of an object type identifying apparatus according to an example embodiment.

The operation recognition unit 201, the object coordinates acquisition unit 202, the object recognition unit 203, the correspondence relation update unit 205, and the update method determination unit 206 are implemented by a central processing unit (CPU) of a computer that operates in accordance with a program (object type identifying program). For example, as illustrated in FIG. 19, a program may be stored in a storage unit (for example, the correspondence relation storage unit 204) of the object type identifying apparatus 200, and a CPU may read the program and operate as the operation recognition unit 201, the object coordinates acquisition unit 202, the object recognition unit 203, the correspondence relation update unit 205, and the update method determination unit 206 in accordance with the program.

Further, the operation recognition unit 201, the object coordinates acquisition unit 202, the object recognition unit 203, the correspondence relation update unit 205, and the update method determination unit 206 may be respectively implemented by dedicated pieces of hardware. Further, the above-described object type identifying apparatus may be configured by two or more physically separated devices wiredly or wirelessly connected to each other. The correspondence relation storage unit 204 is implemented by, for example, a magnetic disk device.

Figure 8:
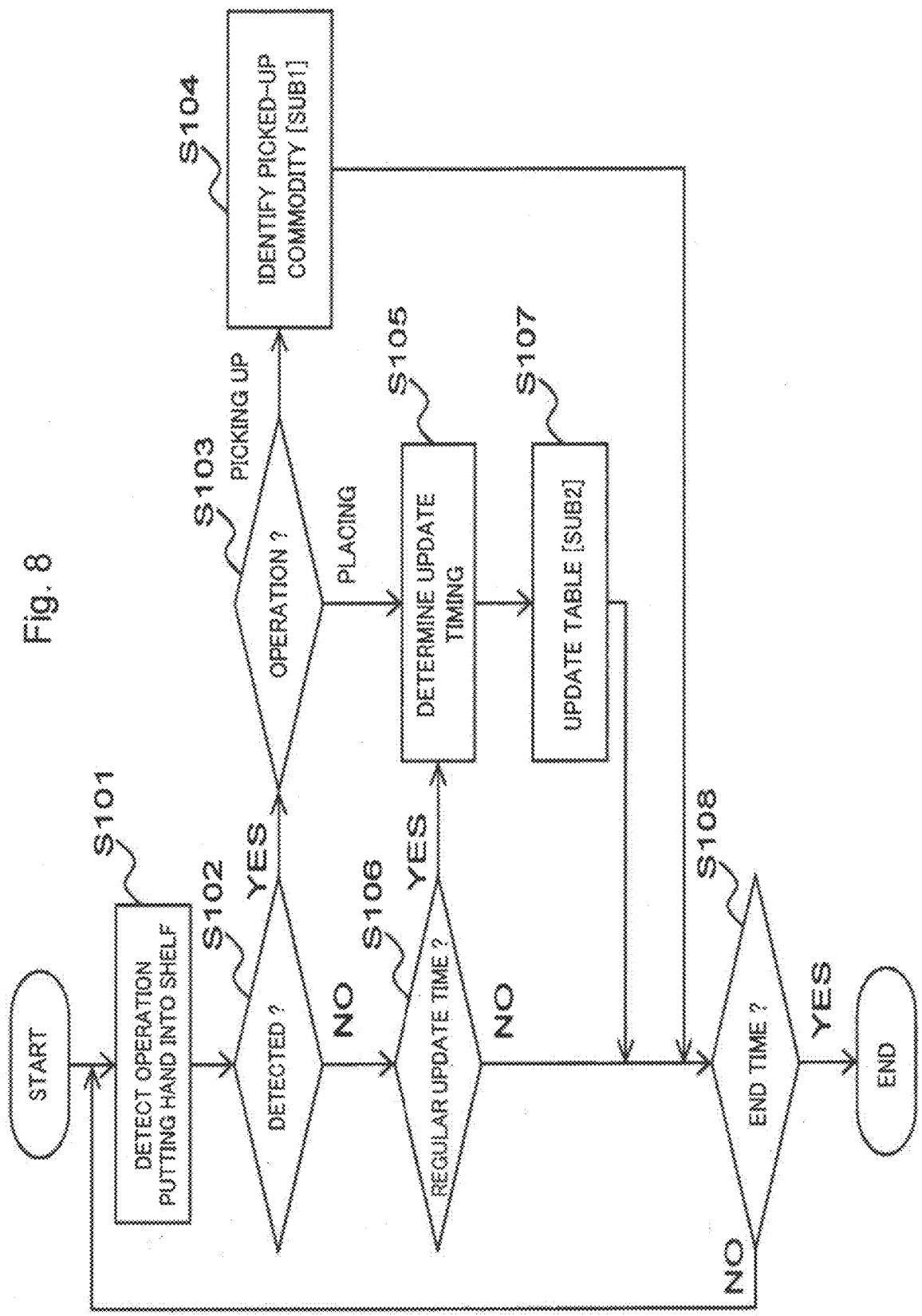
FIG. 8 is a flowchart illustrating an operation example of the object type identifying apparatus according to the first example embodiment.

Next, an operation of the object type identifying apparatus according to the present example embodiment is described. FIG. 8 is a flowchart illustrating an operation example of the object type identifying apparatus according to the present example embodiment. Note that it is assumed that the correspondence relation storage unit 204 stores information indicating a type of an object at a position of each object.

First, the operation recognition unit 201 detects whether or not a person performs an operation of putting his/her hand into a shelf (Step S101). The operation recognition unit 201 detects an operation by a person putting his/her hand into a shelf, on the basis of information acquired from, for example, an RGB camera or a depth camera.

When an operation by a person putting his/her hand into a shelf is detected (YES in Step S102), the operation recognition unit 201 determines whether the operation is an operation of picking up an object or an operation of placing an object (Step S103). The operation recognition unit 201 determines an operation content of a person, on the basis of, for example, an image captured by the camera 22 or information acquired from a switch (pressure sensor) of a shelf.

When an operation of picking up an object is detected ("picking up" in Step S103), the object recognition unit 203 identifies a picked-up commodity (Step S104). Thereafter, the processing proceeds to processing of Step S108.

Meanwhile, when an operation of placing an object is detected ("placing" in Step S103), the update method determination unit 206 determines an update timing (Step S105). Note that, when an operation by a person putting his/her hand into a shelf is not detected (No in Step S102), and when a regular update time has come (YES in Step S106), the update method determination unit 206 determines an update timing (Step S105).

The correspondence relation update unit 205 updates, on the basis of the determined update timing, information stored in the correspondence relation storage unit 204 (Step S107). Thereafter, the processing proceeds to processing of Step S108.

When an update time has not come in Step S106 (NO in Step S106), or after Step S104 or Step S107, the operation recognition unit 201 determines whether or not an end time of a series of processing has come (Step S108). When an end time has not come (NO in Step S108), processing of Step S101 and subsequent steps is performed. Meanwhile, when an end time has come (YES in Step S108), the processing ends.

Figure 9:
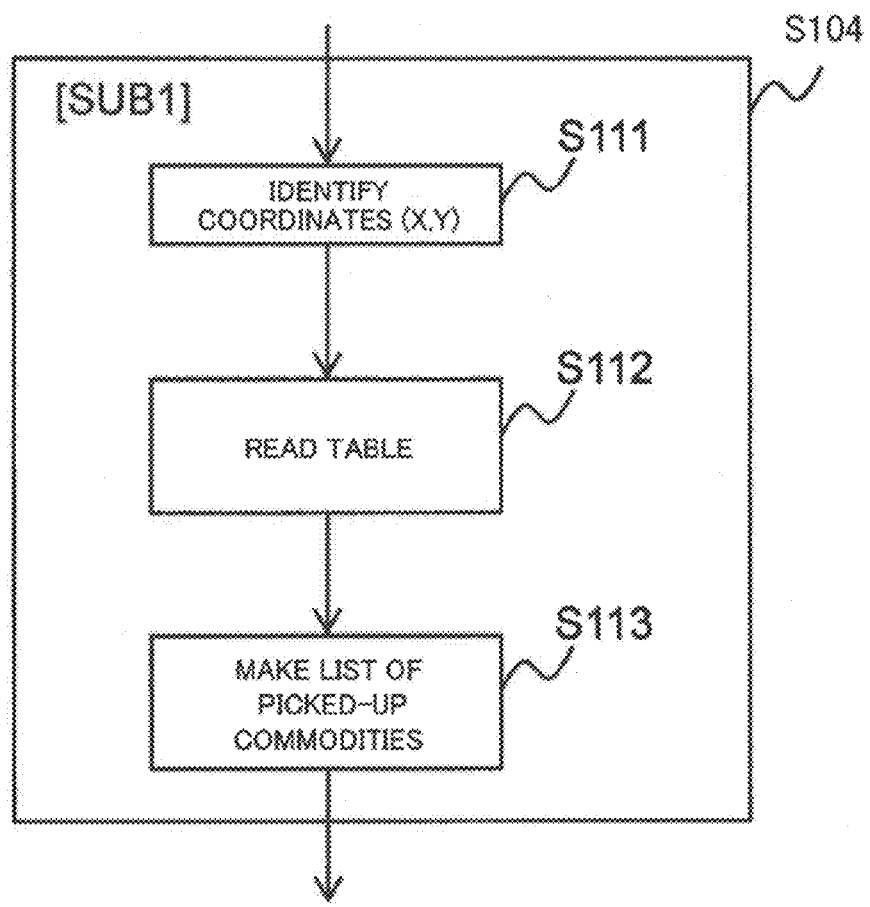
FIG. 9 is a flowchart illustrating an example of processing of identifying a picked-up commodity.

FIG. 9 is a flowchart illustrating an example of processing of identifying a picked-up commodity performed in Step S104 in FIG. 8. When the operation recognition unit 201 detects an operation of picking up an object, the object coordinates acquisition unit 202 identifies object coordinates that are a target of an operation (Step S111). The object recognition unit 203 reads information on corresponding coordinates stored in the correspondence relation storage unit 204 (Step S112).

FIG. 10 is an explanatory diagram illustrating an example of information stored in the correspondence relation storage unit 204. In the example illustrated in FIG. 10, it is indicated that a commodity A is arranged at a position represented by object coordinates (1, 0), and that a commodity B is arranged at a position represented by object coordinates (1, 1). For example, when the object coordinates acquisition unit 202 acquires object coordinates (1, 1), the object recognition unit 203 reads the commodity B of coordinates (1, 1) from the correspondence relation storage unit 204. Consequently, the object recognition unit 203 identifies a picked-up commodity.

Figure 11:
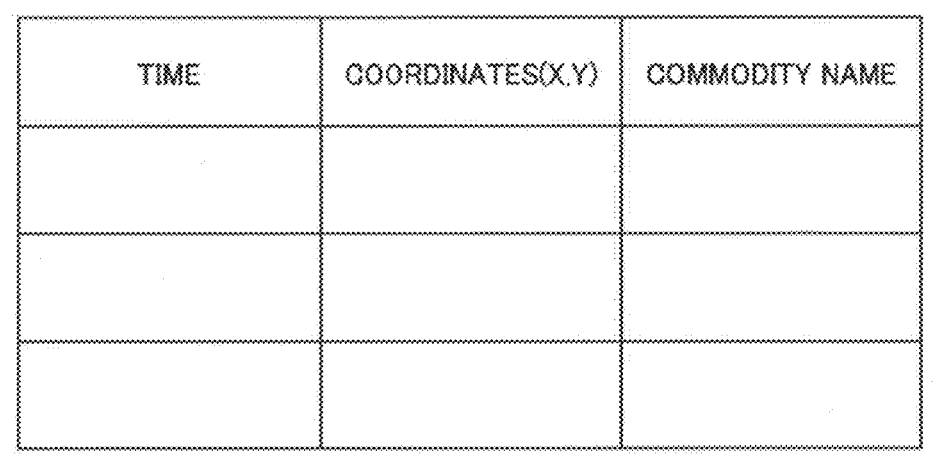

Thereafter, the object recognition unit 203 may make a list of picked-up commodities (Step S113). FIG. 11 is an explanatory diagram illustrating an example of a list of picked-up commodities. In the example illustrated in FIG. 11, it is indicated that a list includes acquired object coordinates, a commodity name, and a time. Note that the object recognition unit 203 may write a commodity name to a list in real time, and may perform an offline analysis later by using this list.

Figure 12:
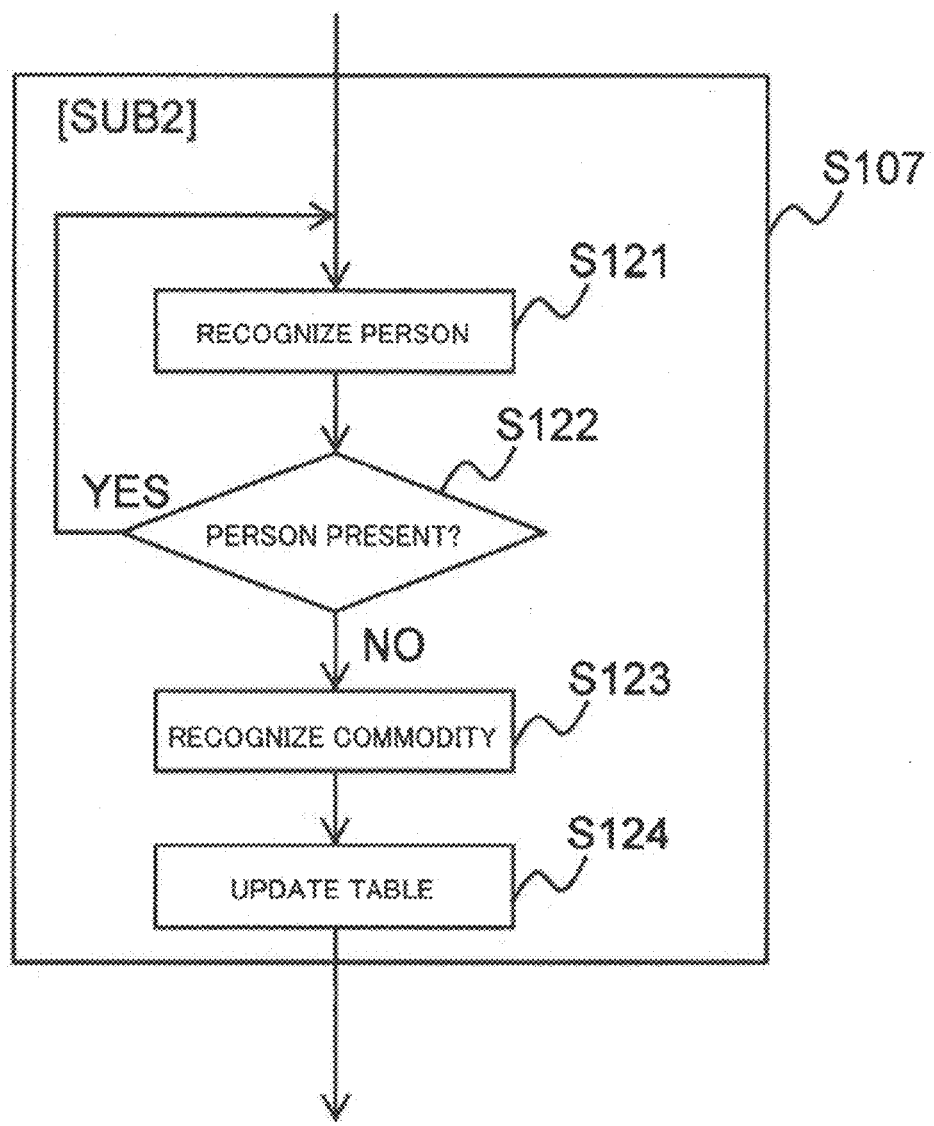
FIG. 12 is a flowchart illustrating an example of processing of updating information stored in the correspondence relation storage unit.

FIG. 12 is a flowchart illustrating an example of processing of updating information stored in the correspondence relation storage unit 204 performed in Step S107 in FIG. 8. When an update timing is determined, the update method determination unit 206 recognizes a person in a target region of an image captured by the camera 24 (Step S121). When a person is recognized in a target region of an image (YES in Step S122), the processing returns to the processing of Step S121. Meanwhile, when a person is not recognized in a target region of an image (NO in Step S122), the object recognition unit 203 recognizes a placed commodity (Step S123).

Then, the correspondence relation update unit 205 updates information of the correspondence table 14 stored in the correspondence relation storage unit 204 (Step S124). At this time, the correspondence relation update unit 205 may manage a correspondence relation between a commodity and a position, by making a new table or a record, instead of updating the same table of the correspondence relation storage unit 204.

As described above, in the present example embodiment, the operation recognition unit 201 determines whether an object is picked up or an object is placed, on the basis of information of a sensor. When the operation recognition unit 201 determines that an object is picked up, the object recognition unit 203 identifies a type of the picked-up object, on the basis of an output of the object coordinates acquisition unit 202 that acquires a position of an object, and information (a relation between a type of an object and a position of the object) stored in the correspondence relation storage unit 204. Meanwhile, when the operation recognition unit 201 determines that an object is placed, the correspondence relation update unit 205 updates information stored in the correspondence relation storage unit 204, by using an image captured by the camera 24. With such a configuration, a type of an object picked up by a person can be correctly identified.

In other words, in the present example embodiment, two pieces of hardware (the camera 22 (sensor) and the camera 24) cooperate with each other, and detection performed by one piece of the hardware triggers operation of another piece of the hardware. Such a configuration makes it possible to correctly identify a type of an object picked up by a person.

In general, an identical commodity is arranged on an identical position of a display shelf. Thus, even when an object is picked up, a type of an object does not generally change. Thus, there is little need to update a content of the correspondence table 14. Meanwhile, when an object is placed at a given position of a display shelf, a content of the object is often unclear. Thus, in the present example embodiment, the correspondence table 14 is updated by detecting placing of an object.

Further, in the present example embodiment, the update method determination unit 206 determines a timing of updating the correspondence table 14 appropriately, and the correspondence relation update unit 205 updates the correspondence table 14 in conformity with an actual state. Accordingly, an object that is a target of an operation can be recognized precisely.

Figure 13:
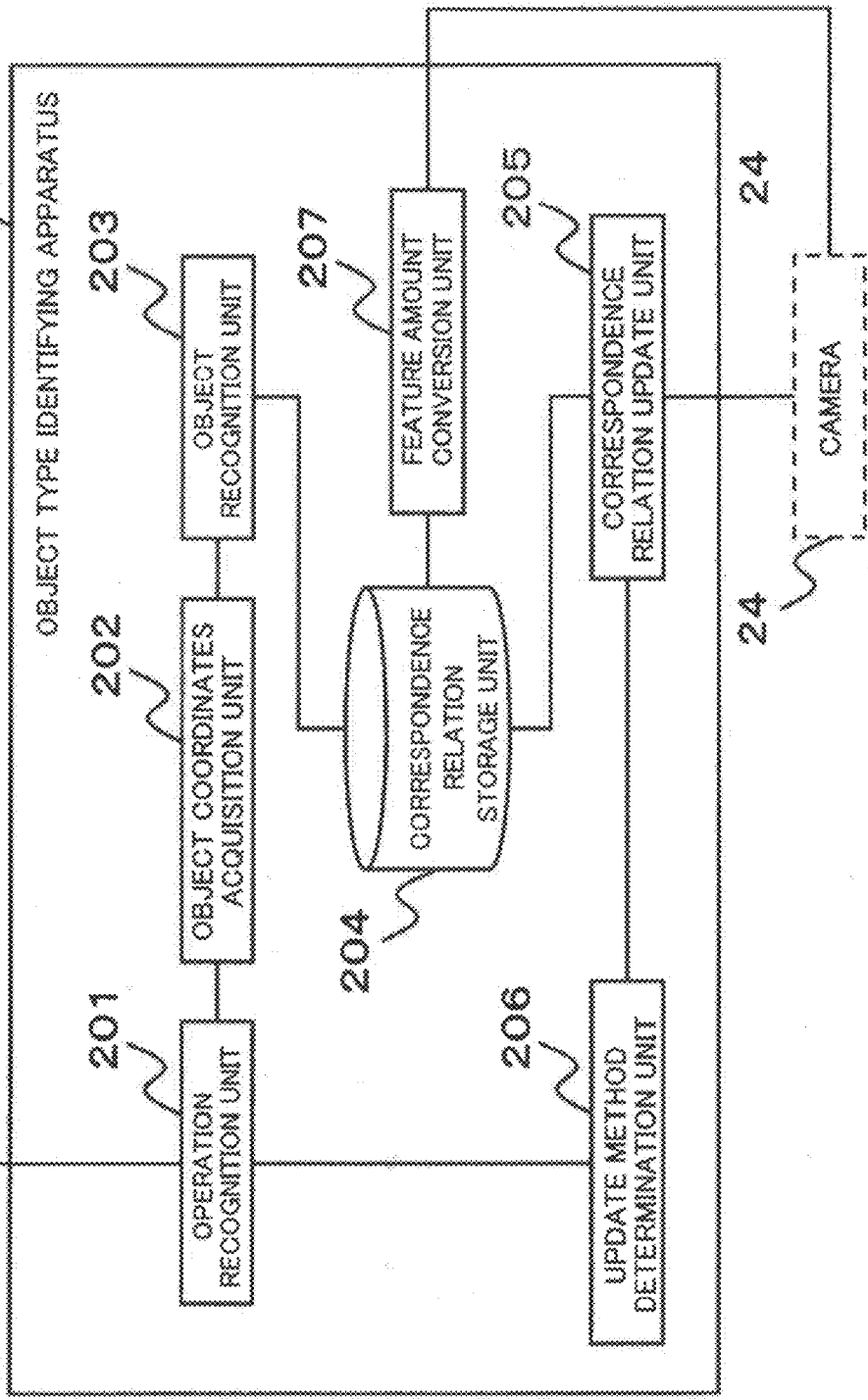
FIG. 13 is a block diagram illustrating a modification example of the object type identifying apparatus according to the first example embodiment.

Next, a modification example of the present example embodiment is described. FIG. 13 is a block diagram illustrating a modification example of the object type identifying apparatus 200 according to the first example embodiment. An object type identifying apparatus 200a exemplified in FIG. 13 includes an operation recognition unit 201, an object coordinates acquisition unit 202, an object recognition unit 203, a correspondence relation storage unit 204, a correspondence relation update unit 205, an update method determination unit 206, and a feature amount conversion unit 207. In other words, the object type identifying apparatus 200 according to the present modification example includes the feature amount conversion unit 207 additionally to the object type identifying apparatus 200 according to the first example embodiment.

In the first example embodiment, a plurality of devices (sensors such as a camera 22 and a camera 24) share information (database) stored in the correspondence relation storage unit 204. In view of the above, the feature amount conversion unit 207 registers, on the correspondence relation storage unit 204 (for example, an object database 33), a feature amount such as color information or a size of an object in an image captured by the camera 24, and further, converts the feature amount into a format that is usable by the camera 22 (sensor). Specifically, the feature amount conversion unit 207 converts an image captured by the camera 24 into a format that is able to be used for identification of a type of an object performed by the object recognition unit 203.

In this case, the object recognition unit 203 becomes able to recognize an object on the camera 22 (sensor) side with reference to a size, on the basis of a size of an object captured by the camera 24. Further, the object recognition unit 203 also becomes able to perform matching on the camera 22 (sensor) side, on the basis of color information captured by the camera 24. In other words, use of such converted information makes it possible to enhance recognition precision of an object. Furthermore, when such conversion is performed, it also becomes possible to use a position of an object as one feature amount.

Example Embodiment 2

Figure 14:
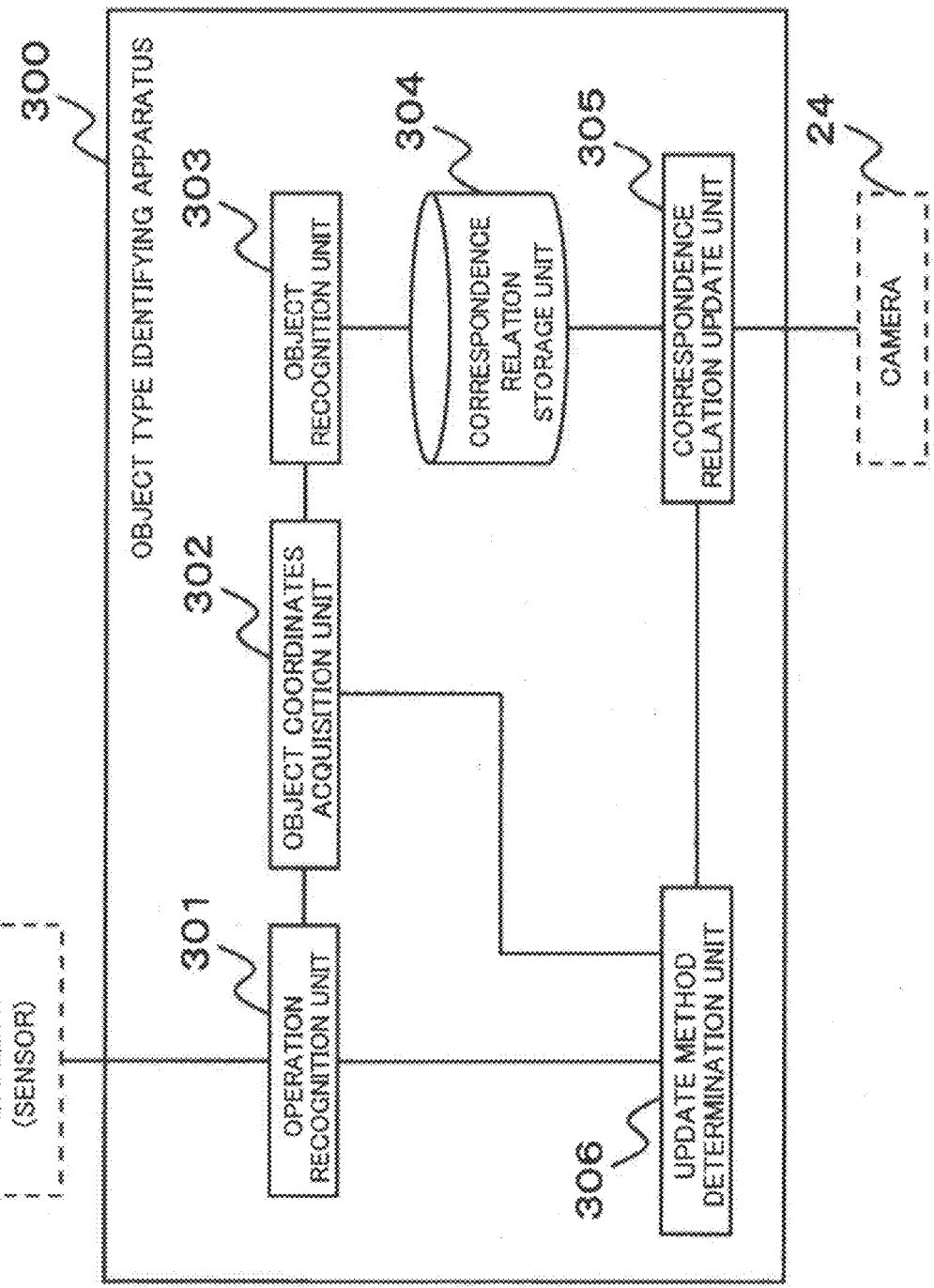
FIG. 14 is a block diagram illustrating a configuration example of an object type identifying apparatus according to a second example embodiment.

Next, a second example embodiment is described. FIG. 14 is a block diagram illustrating a configuration example of an object type identifying apparatus according to the second example embodiment. An object type identifying apparatus 300 according to the present example embodiment includes an operation recognition unit 301, an object coordinates acquisition unit 302, an object recognition unit 303, a correspondence relation storage unit 304, a correspondence relation update unit 305, and an update method determination unit 306.

The operation recognition unit 301, the object coordinates acquisition unit 302, the object recognition unit 303, and the correspondence relation storage unit 304 according to the present example embodiment are similar to the operation recognition unit 201, the object coordinates acquisition unit 202, the object recognition unit 203, and the correspondence relation storage unit 204 according to the first example embodiment, respectively. The object type identifying apparatus 300 may include the feature amount conversion unit 207 according to the modification example of the first example embodiment.

The update method determination unit 306 determines an update timing and an update method, on the basis of at least information on a recognition result of the operation recognition unit 301 and object coordinates acquired by the object coordinates acquisition unit 302. Here, an update method means a method of determining object coordinates to be updated, or a method of determining a candidate for a type of an object to be updated. For a method of determining an update timing, for example, the method by which the update method determination unit 206 determines an update timing in the first example embodiment is used.

The update method determination unit 306 determines, as a target for update, a position or a type of an object being present within a range determined in advance from object coordinates acquired by the object coordinates acquisition unit 302. Then, the correspondence relation update unit 305 updates the determined target (specifically, a correspondence relation between a position and a type of an object), out of information stored in the correspondence relation storage unit 304.

The update method determination unit 306 may determine an update method, on the basis of, for example, object coordinates acquired by the object coordinates acquisition unit 302. Specifically, regarding object coordinates to be updated, the update method determination unit 306 may determine, as a target for update, coordinates at a distance equal to or lower than a certain threshold value from object coordinates acquired by the object coordinates acquisition unit 302.

Further, when the operation recognition unit 301 recognizes an operation of moving an object, the update method determination unit 306 may determine an update method. In this case, the update method determination unit 306 may determine, as a target for update, coordinates at a distance equal to or lower than a threshold value from object coordinates at a source and object coordinates at a destination that are acquired by the object coordinates acquisition unit 302. Further, in this case, regarding a type of an object at a destination to be updated, the update method determination unit 306 may determine to limit a candidate for update to two types; a type of an object originally arranged at a place of a destination, or a type of an object at a source.

The correspondence relation update unit 305 updates information (specifically, information of a correspondence table 14) of the correspondence relation storage unit 304, on the basis of an update timing and an update method determined by the update method determination unit 306. In the present example embodiment, the correspondence relation update unit 305 may update the correspondence table 14 held in the correspondence relation storage unit 304, only for object coordinates determined by the update method determination unit 306 and only for a candidate for a type of an object determined by the update method determination unit 306.

Note that, similarly to the first example embodiment, the operation recognition unit 301, the object coordinates acquisition unit 302, the object recognition unit 303, the correspondence relation update unit 305, and the update method determination unit 306 are implemented by a CPU of a computer that operates in accordance with a program (object type identifying program).

Figure 15:
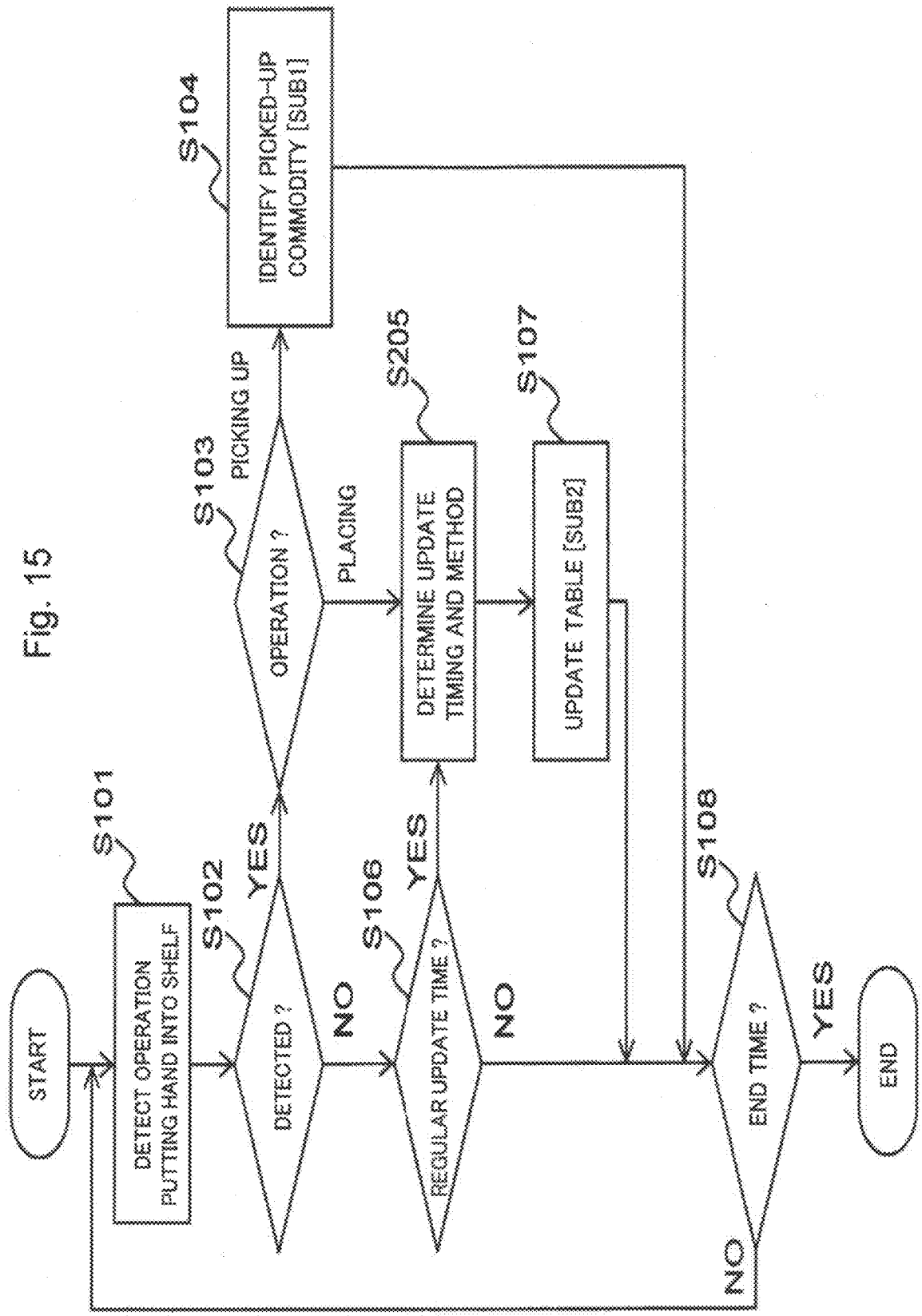
FIG. 15 is a flowchart illustrating an operation example of the object type identifying apparatus according to the second example embodiment.

Next, an operation of the object type identifying apparatus according to the present example embodiment is described. FIG. 15 is a flowchart illustrating an operation example of the object type identifying apparatus according to the present example embodiment. Note that it is assumed that the correspondence relation storage unit 304 stores information indicating a type of an object at a position of each object.

The operation of the present example embodiment is similar to that of the first example embodiment exemplified in FIG. 8. However, the operation of the present example embodiment is different from that of the first example embodiment, in that the update method determination unit 306 determines an update timing and an update method in Step S205.

In Step S205, the update method determination unit 306 determines, as a target for update, a position or a type of an object being present within a range determined in advance from object coordinates acquired by the object coordinates acquisition unit 302.

Then, in Step S107, the correspondence relation update unit 305 updates information stored in the correspondence relation storage unit 304, on the basis of the determined update timing and the update method. Specifically, the correspondence relation update unit 305 updates, at the determined update timing, the determined target (specifically, a correspondence relation between a position and a type of an object), out of information stored in the correspondence relation storage unit 304. Processing other than the above is similar to that of the first example embodiment.

As described above, in the present example embodiment, the update method determination unit 306 determines, as a target for update, a position or a type of an object being present within a range determined in advance from a position of an object acquired by the object coordinates acquisition unit 302. Then, the correspondence relation update unit 305 updates the determined target, out of information stored in the correspondence relation storage unit 304. With such a configuration, the correspondence table 14 is able to be updated efficiently and accurately, in addition to the effect of the first example embodiment.

Example Embodiment 3

Figure 16:
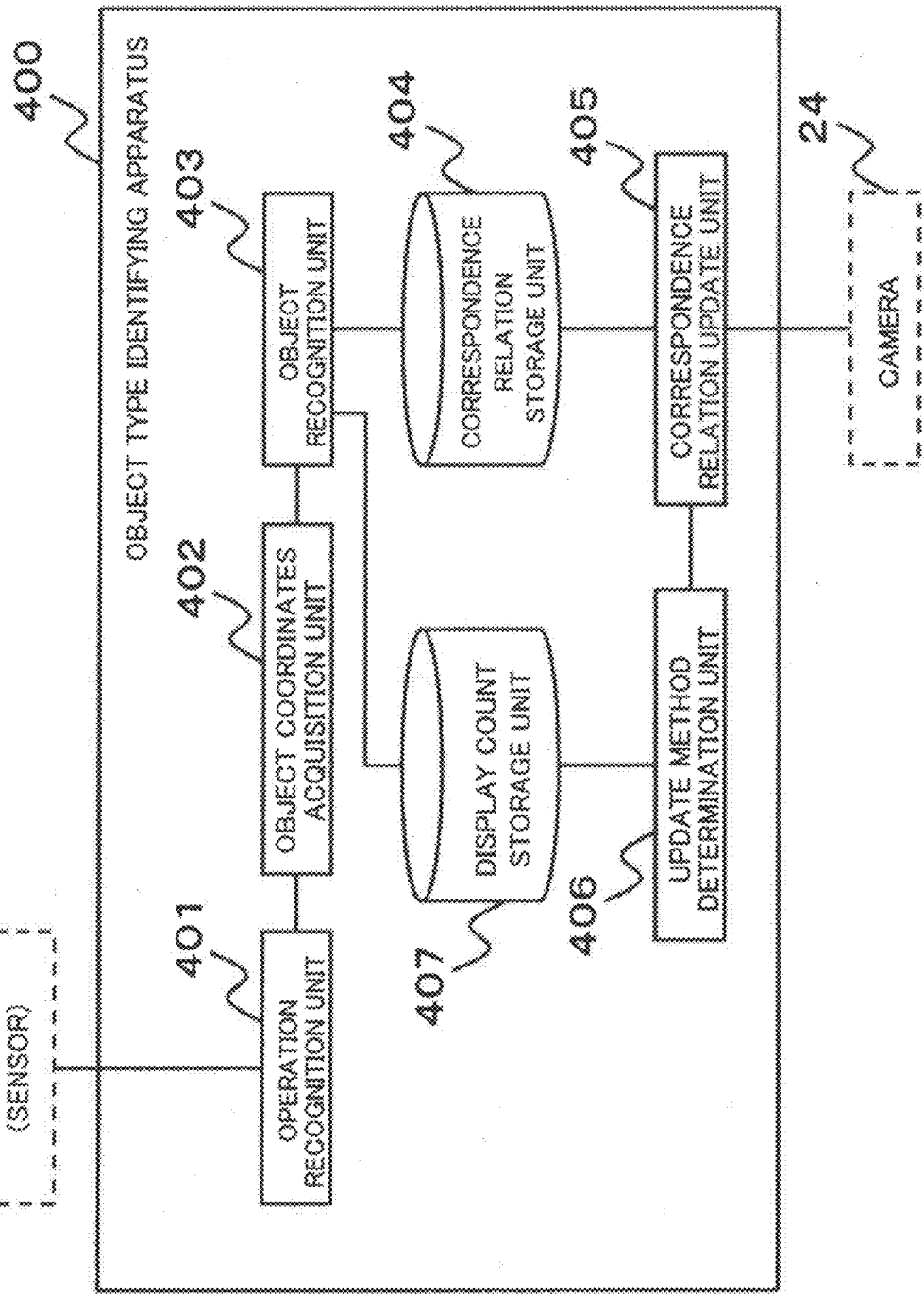
FIG. 16 is a block diagram illustrating a configuration example of an object type identifying apparatus according to a third example embodiment.

Next, a third example embodiment is described. FIG. 16 is a block diagram illustrating a configuration example of an object type identifying apparatus according to the third example embodiment. An object type identifying apparatus 400 according to the present example embodiment includes an operation recognition unit 401, an object coordinates acquisition unit 402, an object recognition unit 403, a correspondence relation storage unit 404, a correspondence relation update unit 405, an update method determination unit 406, and a display count storage unit 407. In other words, the object type identifying apparatus 400 according to the present example embodiment includes the display count storage unit 407 additionally to the object type identifying apparatus 200 according to the first example embodiment or the object type identifying apparatus 300 according to the second example embodiment.

The operation recognition unit 401, the object coordinates acquisition unit 402, and the correspondence relation storage unit 404 according to the present example embodiment are similar to the operation recognition unit 201, the object coordinates acquisition unit 202, and the correspondence relation storage unit 204 according to the first example embodiment, respectively. The object type identifying apparatus 400 may include the feature amount conversion unit 207 according to the modification example of the first example embodiment.

The display count storage unit 407 stores display information including a type and a count of an object arranged at one pair of object coordinates. Specifically, the display count storage unit 407 holds display information in which a type of an object is associated with a count of the object for each pair of object coordinates. The display count storage unit 407 may hold display information including display order. Display information is set in advance in the display count storage unit 407. The display count storage unit 407 is implemented by, for example, a magnetic disk or the like.

The object recognition unit 403 updates display information on the basis of an object recognition result. Specifically, the object recognition unit 403 updates a count of an object, on the basis of an operation recognition result (specifically, a determination result indicating whether an object is picked up or an object is placed) of the operation recognition unit 401.

For example, when a recognition result is "picking up" object "C" from object coordinates (1, 0)', the object recognition unit 403 subtracts 1 from a count of object "C" at object coordinates (1, 0) included in display information stored in the display count storage unit 407.

The correspondence relation update unit 405 and the update method determination unit 406 are similar to the correspondence relation update unit 205 and the update method determination unit 206 according to the first example embodiment. Furthermore, in the present example embodiment, the update method determination unit 406 determines an update timing on the basis of display information stored in the display count storage unit 407.

The update method determination unit 406 may update information stored in the correspondence relation storage unit 404 when the operation recognition unit 401 determines that an object is picked up, and when a count of an object at a picked-up position becomes 0 as a result of subtraction from the count of the object at the position. For example, when a count of object "C" at object coordinates (1, 0) becomes 0 in display information stored in the display count storage unit 407, the update method determination unit 406 determines to update object coordinates (1, 0) promptly to "no object". The correspondence relation update unit 405 updates a type of an object corresponding to object coordinates (1, 0) on a correspondence table 14 stored in the correspondence relation storage unit 404 to "no object", on the basis of determination of the update method determination unit 406.

Note that a type of an object arranged at one pair of object coordinates is not limited to one type. In other words, the display count storage unit 407 may hold, as display information, display order of an object at each pair of object coordinates.

For example, it is assumed that the display count storage unit 407 stores display information including display order "C" "A" "A" (object "C" is arranged ahead and two objects "A" are present behind object "C") at object coordinates (1, 0). Then, it is assumed that the object recognition unit 403 recognizes 'picking up object "C" from object coordinates (1, 0)'.

In this case, the update method determination unit 406 detects that object "A" is arranged at object coordinates (1, 0), from display information stored in the display count storage unit 407. Since a change of a type of an object is detected with this detection, the update method determination unit 406 determines to update a type of an object at object coordinates (1, 0) promptly to "A". The correspondence relation update unit 405 updates a type of an object corresponding to object coordinates (1, 0) on the correspondence table 14 stored in the correspondence relation storage unit 404 to "A", on the basis of determination of the update method determination unit 406.

Note that, similarly to the first example embodiment, the operation recognition unit 401, the object coordinates acquisition unit 402, the object recognition unit 403, the correspondence relation update unit 405, and the update method determination unit 406 are implemented by a CPU of a computer that operates in accordance with a program (object type identifying program).

Figure 17:
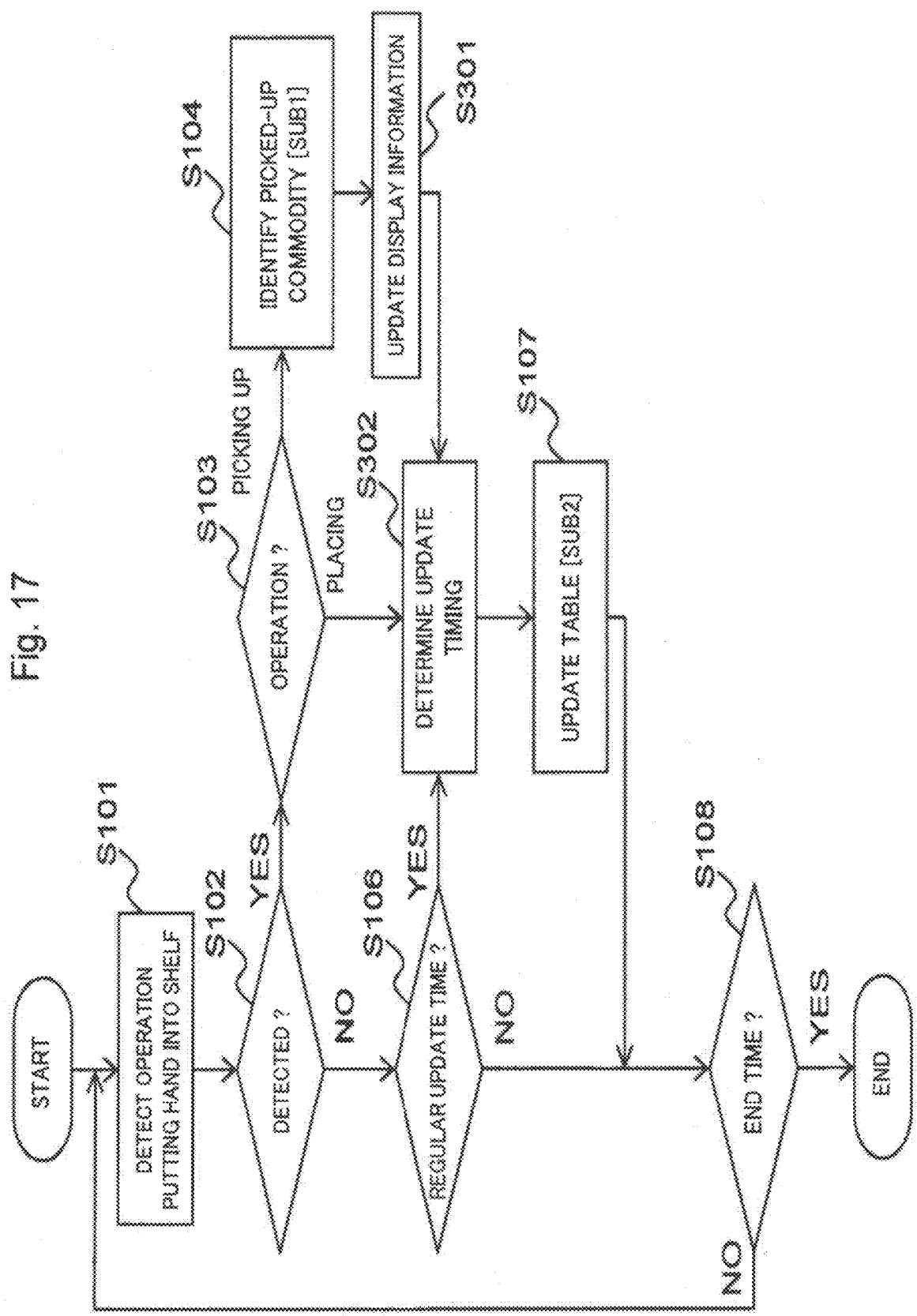
FIG. 17 is a flowchart illustrating an operation example of the object type identifying apparatus according to the third example embodiment.

Next, an operation of the object type identifying apparatus according to the present example embodiment is described. FIG. 17 is a flowchart illustrating an operation example of the object type identifying apparatus according to the present example embodiment. Note that it is assumed that the correspondence relation storage unit 404 stores information indicating a type of an object at a position of each object.

The operation of the present example embodiment is similar to that of the first example embodiment exemplified in FIG. 8. The operation of the present example embodiment is different from that of the first example embodiment, in that processing (Step S301) of updating display information after identifying a picked-up commodity in Step S104 is added, and in that processing (Step S302) of determining an update timing on the basis of update of display information is changed.

In Step S301, the object recognition unit 403 updates display information stored in the display count storage unit 407, according to a type of an identified object. In Step S302, the update method determination unit 406 determines an update timing on the basis of the display information stored in the display count storage unit 407. Specifically, when it is determined that an object is picked up, the update method determination unit 406 may determine to update information stored in the correspondence relation storage unit 404 when a count of an object at a picked-up position becomes 0, or when a type of an object at the position is changed. Processing other than the above is similar to that of the first example embodiment.

As described above, in the present example embodiment, the display count storage unit 407 stores display information in which a position of an object is associated with a type and a count of the object. Then, the object recognition unit 403 updates the display information, according to a type of an identified object. Specifically, when the operation recognition unit 401 determines that an object is picked up, the object recognition unit 403 subtracts from a count of an object at a picked-up position among display information stored in the display count storage unit 407, and updates information stored in the storage unit when the count becomes 0. With such a configuration, the correspondence table 14 is able to be updated efficiently and accurately, in addition to the effect of the first example embodiment.

In other words, in the present example embodiment, the update method determination unit 406 determines an update timing and an update method on the basis of at least display information held in the display count storage unit 407, and the correspondence relation update unit 405 updates the correspondence table 14 on the basis of the determined update timing and the update method. This makes it possible to update the correspondence table 14 efficiently and accurately.

Figure 18:
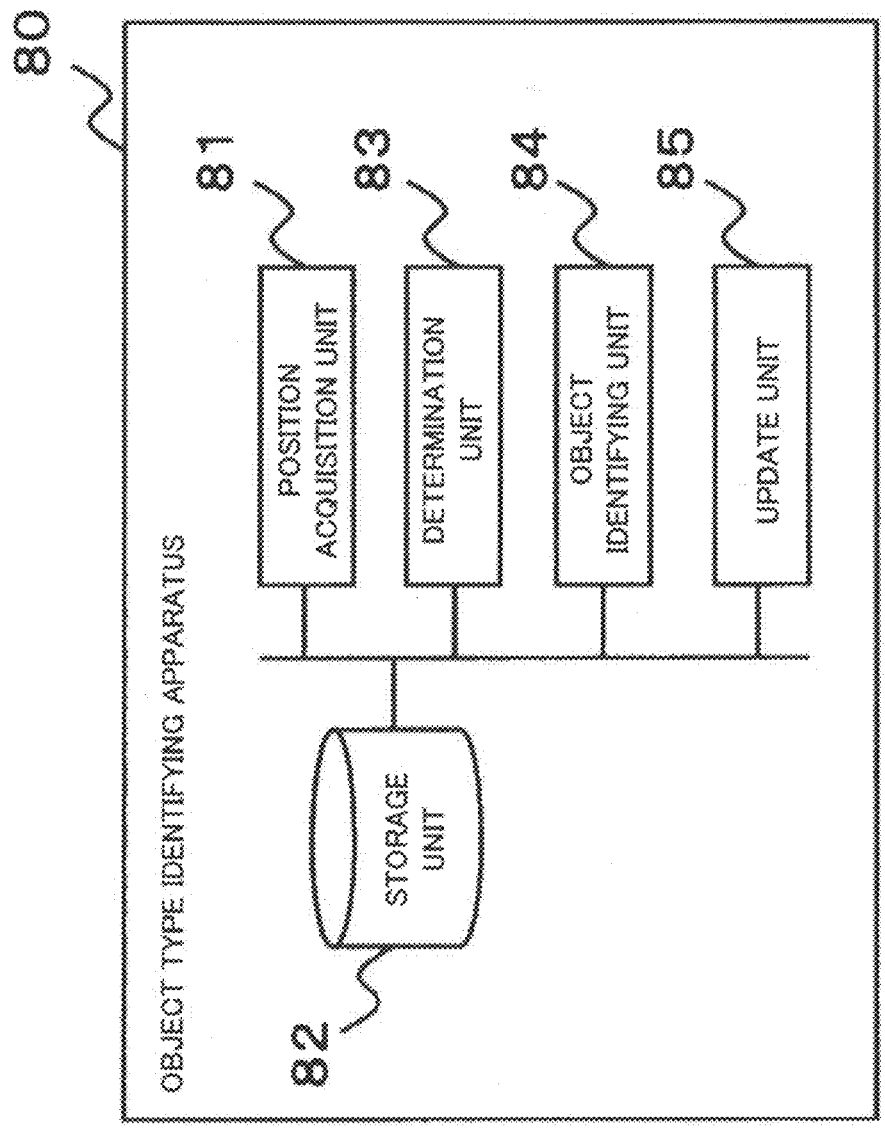
FIG. 18 is a block diagram illustrating an overview of an object type identifying apparatus according to an example embodiment.

Next, an overview of an object type identifying apparatus is described. FIG. 18 is a block diagram illustrating an overview of an object type identifying apparatus. An object type identifying apparatus 80 includes a position acquisition unit 81 (for example, the object coordinates acquisition unit 202) that acquires a position of an object (for example, object coordinates), a storage unit 82 (for example, the correspondence relation storage unit 204) that stores information indicating a type of the object at a position of each object, a determination unit 83 (for example, the operation recognition unit 201) that determines whether an object is picked up or an object is placed, on the basis of information of a sensor (for example, an image sensor such as an RGB camera or a depth camera), an object identifying unit 84 (for example, the object recognition unit 203) that identifies, when the determination unit 83 determines that an object is picked up, a type of the picked-up object, on the basis of an output of the position acquisition unit 81 and information stored in the storage unit 82, and an update unit 85 (for example, the update method determination unit 206, the correspondence relation update unit 205) that updates, when the determination unit 83 determines that an object is placed, information stored in the storage unit 82, by using an image captured by a camera (for example, the camera 24) that captures an image of arrangement of each object from a front side.

With such a configuration, a type of an object picked up by a person is able to be correctly identified.

Further, the update unit 85 (for example, the update method determination unit 306, the correspondence relation update unit 305) may determine, as a target for update, a position or a type of an object being present within a range determined in advance from a position of an object acquired by the position acquisition unit 81, and may update the determined target, among information stored in the storage unit 82.

Further, the object type identifying apparatus 80 may include a display count storage unit (for example, the display count storage unit 407) that stores display information in which a position of an object is associated with a type and a count of the object. Then, the object identifying unit 84 (for example, the object recognition unit 403) may update display information, according to a type of an identified object.

Specifically, when the determination unit 83 determines that an object is picked up, the object identifying unit 84 may subtract from a count of an object at a picked-up position among display information stored in the display count storage unit, and may update information stored in the storage unit 82 when the count becomes 0.

Further, when an object or a person other than a target is not detected in an image captured by a camera (for example, the camera 24), the update unit 85 may update information stored in the storage unit 82.

Further, when a difference between an image used in previous update of the storage unit and a newly captured image exceeds a threshold value determined in advance, the update unit 85 may update information stored in the storage unit 82.

Further, the object type identifying apparatus 80 may include a feature amount conversion unit (for example, the feature amount conversion unit 207) that converts an image captured by a camera into a format that is able to be used for identification of a type of an object performed by the object identifying unit 84.

Further, the determination unit 83 may determine whether an object is picked up or an object is placed, on the basis of information of a pressure sensor provided at a place where an object is placed.

Further, a part or all of the example embodiments described above can be described as the following supplementary notes, but are not limited to the following.

(Supplementary Note 1)

An object type identifying apparatus comprising:
a position acquisition unit configured to acquire a position of an object;
a storage unit configured to store information indicating a type of the object at a position of each object;
a determination unit configured to determine whether an object is picked up or an object is placed, based on sensor information;
an object identifying unit configured to, when the determination means determines that an object is picked up, identify a type of the picked-up object, based on an output of the position acquisition means and information stored in the storage means; and
an update unit configured to, when the determination means determines that an object is placed, update information stored in the storage unit, using an image captured by a camera that captures an image of arrangement of each object from a front side.

(Supplementary Note 2)

The object type identifying apparatus according to Supplementary note 1, wherein
the update means determines, as a target for update, a position or a type of an object being present within a range determined in advance from a position of an object being acquired by the position acquisition means, and updates the determined target out of information stored in the storage means.

(Supplementary Note 3)

The object type identifying apparatus according to Supplementary note 1 or 2, further comprising
display count storage means for storing display information in which a position of an object is associated with a type and a count of the object, wherein
the object identifying means updates the display information, according to a type of an identified object.

(Supplementary Note 4)

The object type identifying apparatus according to Supplementary note 3, wherein,
when the determination means determines that an object is picked up, the object identifying means decreases a count of an object at a picked-up position out of display information stored in the display count storage means, and updates information stored in the storage means when the count becomes 0.

(Supplementary Note 5)

The object type identifying apparatus according to any one of Supplementary notes 1 to 4, wherein,
when an object or a person other than a target is not detected in an image captured by a camera, the update means updates information stored in the storage means.

(Supplementary Note 6)

The object type identifying apparatus according to any one of Supplementary notes 1 to 5, wherein,
when a difference between an image used in previous update of the storage means and a newly captured image exceeds a threshold value determined in advance, the update means updates information stored in the storage means.

(Supplementary Note 7)

The object type identifying apparatus according to any one of Supplementary notes 1 to 6, further comprising
feature amount conversion means for converting an image captured by a camera into a format that is able to be used for identification of a type of an object performed by the object identifying means.

(Supplementary Note 8)

The object type identifying apparatus according to any one of Supplementary notes 1 to 7, wherein
the determination means determines whether an object is picked up or an object is placed, based on information of a pressure sensor provided at a place where an object is placed.

(Supplementary Note 9)

An object type identifying method comprising:
determining whether an object is picked up or an object is placed, based on sensor information;
acquiring, when determined that an object is picked up, a position of an object, and identifying a type of the picked-up object, based on information stored in storage means which stores information indicating a type of an object at a position of each object and the positon of the object acquired; and
updating, when determined that an object is placed, information stored in the storage means, using an image captured by a camera that captures an image of arrangement of each object from a front side.

(Supplementary Note 10)

The object type identifying method according to Supplementary note 9, further comprising:
determining, as a target for update, a position or a type of an object being present within a range determined in advance from a position of an object being acquired, and updating the determined target out of information stored in the storage means.

(Supplementary Note 11)

A computer readable storage medium storing an object type identifying program that causes a computer to execute:
a position acquisition process of acquiring a position of an object;
a determination process of determining whether an object is picked up or an object is placed, based on sensor information;
an object identification process of, when determined at the determination process that an object is picked up, identifying a type of the picked-up object, based on an acquisition result of the position acquisition process and information stored in storage means which stores information indicating a type of an object at a position of each object; and
an updating process of, when determined at the determination process that an object is placed, updating information stored in the storage means, using an image captured by a camera that captures an image of arrangement of each object from a front side.

(Supplementary Note 12)

The computer readable storage medium according to Supplementary note 11, wherein storing the object type identifying program that causes a computer to execute:
at the updating process, determining, as a target for update, a position or a type of an object being present within a range determined in advance from a position of an object being acquired at the position acquisition process, and updating the determined target out of information stored in the storage means.

INDUSTRIAL APPLICABILITY

The object type identifying apparatus described in each of the above-described example embodiments can be suitably applied to an analysis or the like of good-selling shelf arrangement, in a retail store such as, for example, a convenience store. Use of the object type identifying apparatus for such an analysis or the like makes it possible to obtain useful marketing information.

In the above, the present invention has been described by using each of the above-described example embodiments as an exemplary example. However, the present invention is not limited to the above-described example embodiments. In other words, various modes that a person skilled in the art can understand is able to be applied to the present invention within the scope of the present invention.

REFERENCE SIGNS LIST 11, 21, 32 Shelf
12, 22 Camera (sensor)
13, 23, 25 Information processing terminal
14 Correspondence table
24 Camera
31 Camera image
33 Object database
201, 301, 401 Operation recognition unit
202, 302, 402 Object coordinates acquisition unit
203, 303, 403 Object recognition unit
204, 304, 404 Correspondence relation storage unit
205, 305, 405 Correspondence relation update unit
206, 306, 406 Update method determination unit
207 Feature amount conversion unit
407 Display count storage unit

What is claimed is:
1. An object identifying apparatus comprising:
one or more memories configured to store instructions; and
one or more processors configured to execute the instructions to:
store display information in which a position of an object is associated with a count and a type of the object;
determine whether an object is picked up or an object is placed, based on sensor information acquired by one or more sensors;
identify the type of the object picked up or placed, based on the sensor information; and
when the count of the object at a picked-up position becomes zero, or when the type of the object at the position is changed, update the stored information.

2. The object identifying apparatus according to claim 1, wherein the one or more sensors are image sensors.

3. The object identifying apparatus according to claim 1, wherein
the one or more processors are further configured to execute the instructions to:
based on the determination that the object is placed on a different position within a predetermined range, update the stored position to the different position.

4. The object identifying apparatus according to claim 1, wherein the sensor information is based on a pressure sensor provided at a place where an object is placed.

5. An object identifying method comprising:
storing display information in which a position of an object is associated with a count and a type of the object;
determining whether an object is picked up or an object is placed, based on sensor information acquired by one or more sensors;
identifying the type of the object picked up or placed, based on the sensor information; and
when the count of the object at a picked-up position becomes zero, or when the type of the object at the position is changed, updating the stored information.

6. A non-transitory computer readable storage medium storing an object identifying program that causes a computer to execute:
storing display information in which a position of an object is associated with a count and a type of the object;
determining whether an object is picked up or an object is placed, based on sensor information acquired by one or more sensors;
identifying the type of the object picked up or placed, based on the sensor information; and
when the count of the object at a picked-up position becomes zero, or when the type of the object at the position is changed, updating the stored information.

* * * * *